(12) United States Patent
Takashima

(10) Patent No.: US 8,014,648 B2
(45) Date of Patent: Sep. 6, 2011

(54) INFORMATION RECORDING APPARATUS, INFORMATION RECORDING METHOD, PROGRAM STORAGE MEDIUM, AND PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1352 days.

(21) Appl. No.: 11/172,848

(22) Filed: Jul. 5, 2005

(65) Prior Publication Data

US 2006/0007821 A1    Jan. 12, 2006

(30) Foreign Application Priority Data

Jul. 8, 2004    (JP) .................................. 2004-201990

(51) Int. Cl.
*H04N 5/765* (2006.01)
*H04N 5/93* (2006.01)
(52) U.S. Cl. ........................................ 386/200; 386/353
(58) Field of Classification Search ....................... 386/46
See application file for complete search history.

(56) References Cited

U.S. PATENT DOCUMENTS

| | | | |
|---|---|---|---|
| 6,631,388 B1 * | 10/2003 | Watanabe et al. ............ | 707/206 |
| 7,024,534 B2 * | 4/2006 | Sasaki et al. ................. | 711/170 |
| 2002/0178059 A1 * | 11/2002 | Hatakeyama .................. | 705/14 |
| 2004/0133740 A1 * | 7/2004 | Prewitt ......................... | 711/112 |
| 2004/0240863 A1 * | 12/2004 | Nishizawa .................... | 386/125 |
| 2004/0241378 A1 * | 12/2004 | Komaki et al. .............. | 428/64.4 |

FOREIGN PATENT DOCUMENTS

| | | |
|---|---|---|
| JP | 07-168749 | 7/1995 |
| JP | 09-288884 | 11/1997 |
| JP | 2002-351371 | 12/2002 |
| JP | 2004-38675 | 2/2004 |
| JP | 2004-178034 | 6/2004 |
| JP | 2006-107689 | 4/2006 |
| WO | WO 03/015094 A1 | 2/2003 |
| WO | WO 2005/122169 A1 | 12/2005 |

OTHER PUBLICATIONS

"Universal Disk Format Specification Revision 2.50", Optical Storage Technology Association, Apr. 30, 2003, cover page and pp. 33-35, 39-46, 51, 56, 147-150.

* cited by examiner

*Primary Examiner* — Peter-Anthony Pappas
*Assistant Examiner* — Oluwaseun A Adegeye
(74) *Attorney, Agent, or Firm* — Oblon, Spivak, McClelland, Maier & Neustadt, L.L.P.

(57) ABSTRACT

An information recording apparatus includes recording means for recording a file and filesystem information on a recording medium; filesystem-information generating means for generating the filesystem information for every application software program using the file; and operation control means for controlling the operation of the recording means so as to allocate the filesystem information, generated for every application software program using the file by the filesystem-information generating means, to virtual addresses as one file. When the file is to be recorded by the recording means, the operation control means controls the recording means so as to update the filesystem information corresponding to the application software program using the file to be recorded and to record the updated filesystem information on the recording medium.

11 Claims, 19 Drawing Sheets

FIG. 8

| LSN | Structure | Descriptors | LBN |
|---|---|---|---|
| 0~15 | — | Reserved | |
| 16~18 | Volume Recognition Sequence | — | |
| 19~31 | — | Reserved | |
| 32 | Main Volume Descriptor Sequence ② | Primary Volume Descriptor | |
| 33 | | Implementation Use Volume Descriptor | |
| 34 | | Partition Descriptor | |
| 35 | | Logical Volume Descriptor ③ | |
| 36 | | Unallocated Space Descriptor | |
| 37 | | Terminating Descriptor | |
| 38~47 | | Trailing Logical Sectors | |
| 48 | Logical Volume Integrity Sequence | Logical Volume Integrity Descriptor ④ | |
| 49 | | Terminating Descriptor | |
| 50~63 | — | Trailing Logical Sectors | |
| 64~255 | — | Reserved | |
| 256 | Anchor-1 | Anchor Volume Descriptor Pointer ① | |
| 257~271 | Partition | Reserved | |
| 272~LSNall-272 | — | File Structure and Files ⑤ | 0~LBNall |
| LSNall-271~LSNall-257 | — | Reserved | |
| LSNall-256 | Anchor-2 | Anchor Volume Descriptor Pointer | |
| LSNall-255~LSNall-224 | — | Reserved | |
| LSNall-223~LSNall-208 | Reserved Volume Descriptor Sequence | (SAME AS Main Volume Descriptor Sequence) | |
| LSNall-207~LSNall-1 | — | Reserved | |
| LSNall | Anchor-3 | Anchor Volume Descriptor Pointer | |

FIG. 9

| LBN | Structure | Descriptors |
|---|---|---|
| 0~A | Space Bitmap | Space Bitmap Descriptor |
| A+1 | File Set Descriptor Sequence | File Set Descriptor |
| A+2 | | Terminating Descriptor |
| A+3 | ICB for Root Directory | FE (Root Directory) |
| A+4 | Root Directory | FID (parent directory) |
|  |  | FID (BDMV) |
|  |  | FID (Resource) |
|  |  | FID (DATA1) |
|  |  | FID (DATA2) |
| A+5 | ICB for BDMV Directory | FE (BDMV) |
| A+6 | ICB for Resource Directory | FE (Resource) |
| A+7 | ICB for DATA1 Directory | FE (DATA1) |
| A+8 | ICB for DATA2 Directory | FE (DATA2) |
| A+9 | BDMV Directory | FID (parent directory) |
|  |  | FID (Unit_Key_Gen_Value.inf) |
|  |  | FID (CPS_CCI.inf) |
|  |  | : |
|  |  | FID (STREAM) |
| A+10 | ICBs for files/directories under BDMV Directory | FE (Unit_Key_Gen_Value.inf) |
| A+11 |  | FE (CPS_CCI.inf) |
| .. |  | : |
| A+16 |  | FE (STREAM) |

Arrows labeled ⑪ ⑫ ⑬ ⑭ ⑮ ⑯ ⑰ → TO POSITION WHERE FILE DATA IS STORED

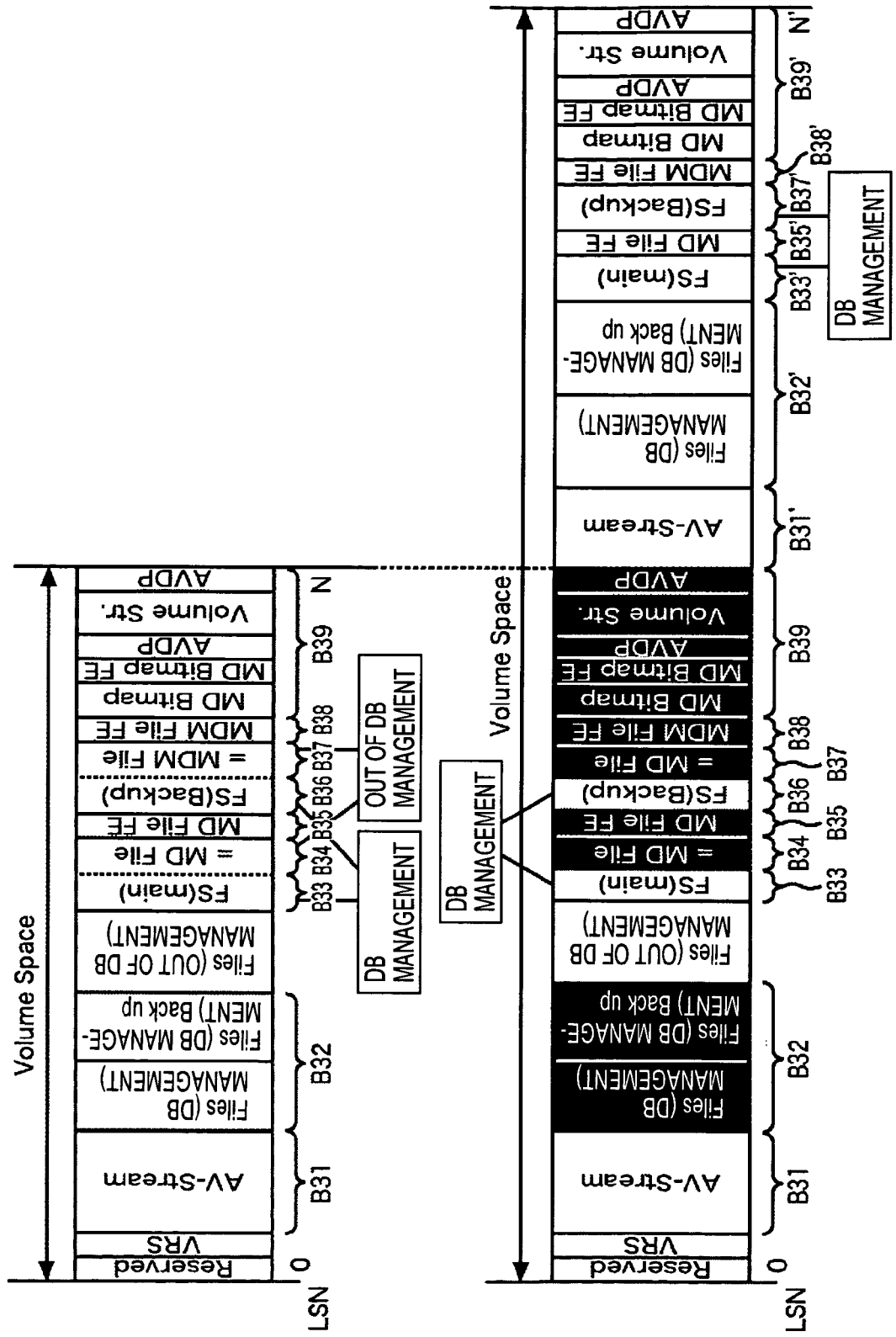

INFORMATION RECORDING APPARATUS, INFORMATION RECORDING METHOD, PROGRAM STORAGE MEDIUM, AND PROGRAM

CROSS REFERENCES TO RELATED APPLICATIONS

The present invention contains subject matter related to Japanese Patent Application JP 2004-201990 filed in the Japanese Patent Office on Jul. 8, 2004, the entire contents of which are incorporated herein by reference.

BACKGROUND OF THE INVENTION

1. Field of the Invention

The present invention relates to information recording apparatuses, information recording methods, program storage media, and programs. More specifically, the present invention relates to an information recording apparatus, an information recording method, a program storage medium, and a program which are capable of saving the space on a recording medium, when an additional file is to be recorded, by recording only the filesystem information corresponding to an application software program using the file to be recorded.

2. Description of the Related Art

Technologies of recording files in high-capacity recording media have been in widespread use.

At the same time, various formats for use in recording files in such high-capacity recording media have been proposed.

For example, the formats include Universal Disk Format (UDF) used in digital versatile discs (DVDs) (for example, Universal Disk Format Specification Revision 2.50, Apr. 30, 2003, Optical Storage Technology Association).

SUMMARY OF THE INVENTION

A function of allocating filesystem information to virtual addresses in an area called a metadata partition is added to the above UDF (Revision 2.50).

However, in a write-once medium (recording medium in which data can be recorded at once), when an additional file is recorded, the area where the previous filesystem information has been recorded is made unreadable, new filesystem information is generated, and the generated filesystem information is recorded in a new area on the recording medium. Since repeating recording of additional files causes the filesystem information to be repeatedly recorded in new areas and the area where the old filesystem information has been recorded is made unreadable, there is a problem in that the areas on the recording medium are wasted for recording the files.

For example, in a Blu-ray disc (hereinafter also referred to as a BD) based on the UDF (Revision 2.50), files and filesystem information are recorded as shown in the upper part in FIG. 1. FIG. 1 shows an example of the recording state on a BD write-once medium (hereinafter also referred to as a Blu-ray disc-recordable: BD-R). Referring to FIG. 1, logical sector numbers (LSNs) (virtual addresses) are set from the left-hand side. The LSNs from zero to N are allocated to areas set as volume spaces in the upper part in FIG. 1. An area indicated by "Reserved", at the head of the LSNs, denotes a reserved area. "VRS (Volume recognition sequence)" denotes an area in which the information used for recognizing the type of the filesystem is recorded. "AV-Stream" denotes an area in which stream data to be recorded or played back by an application software program used for recording and/or playing back the stream data on the BD-R is recorded.

"Files (DB management)" denotes an area in which files that are used for playing back the stream data and are managed in a database by the application software program used for recording and/or playing back the stream data on the BD-R are recorded. "Files (out of DB management) denotes an area in which files that are not managed in the database by the application software program used for recording and/or playing back the stream data on the BD-R are recorded. "FS=MD File (Metadata File)" denotes an area in which the filesystem information is recorded as metadata. The area indicated by the "FS" is divided into the area (at the left side in FIG. 1: the area described as out of DB management) in which the filesystem information concerning the files that are not managed by the application software program used for recording and/or playing back the stream data on the BD-R is described and the area (at the right side in FIG. 1: the area described as DB management) in which the filesystem information concerning the files that are managed by the application software program used for recording and/or playing back the stream data on the BD-R is described.

"MD File FE" denotes an area in which information concerning a file entry (FE) indicating the position of filesystem information (hereinafter referred to as FS) is recorded. "MD Bitmap" denotes an area in which information used for managing the information concerning the use of the area having the filesystem information is described. "MD Bitmap FE" denotes an area in which information concerning a file entry (FE) indicating the position of the MD Bitmap is recorded. "AVDP" denotes an area in which anchor information is recorded. There are two areas denoted by "AVDP". "Volume Str. (Volume Structure)" denotes an area in which information concerning the volume structure is recorded. The areas denoted by the "AV-Stream" and the "Files (DB management)" are referred to as an area B1. In the "FS", the area in which the filesystem information concerning the files that are not managed by the application software program used for recording and/or playing back the stream data on the BD-R is descried is referred to as an area B2, and the area in which the filesystem information concerning the files that are managed by the application software program used for recording and/or playing back the stream data on the BD-R is descried is referred to as an area B3. The areas denoted by the "MD File FE", "MD Bitmap", "MD Bitmap FE", "AVDP", and "Volume Str." are collectively referred to as an area B4.

For example, when additional stream data is recorded on the BD-R in the state shown in the upper part in FIG. 1 and the files that are managed in the database by the application software program used for recording and/or playing back the stream data are updated, the information is recorded on the BD-R in a manner shown in the lower part in FIG. 1.

Specifically, the additional stream data that is recorded in the information described in the area B1 and the files that are used for playing back the stream data and that are managed in the database are recorded in an area B1'. The file system information (FS) updated with the additional information recorded in the area B1' is recorded in an area downstream of the area B1'. In the FS, the filesystem information concerning the files that are not managed by the application software program used for recording and/or playing back the stream data on the BD-R is recorded in an area B2', and the filesystem information concerning the files that are managed by the application software program used for recording and/or playing back the stream data on the BD-R is recorded in an area B3'. The "MD File FE", the "MD Bitmap", the "MD Bitmap FE", the "AVDP", and the "Volume Str." corresponding to the updated FS are recorded in an area B4'. The "FS", the "MD File FE", the "MD Bitmap", the "MD Bitmap FE", the "AVDP", and the "Volume Str." that have been recorded in the areas B2, B3, and B4 are made unreadable.

Since the areas from B2 to B4 are repeatedly made unreadable and accumulated each time an additional file is recorded, the storage area on the recording medium is wasted. Particularly, in the case of the write-once medium (recording medium in which data can be recorded at once), there is a problem in that the recordable area on the recording medium is reduced in size each time an additional file is recorded because the unreadable areas is not able to be used again.

It is desirable to minimize the space occupied by the recorded file system information when additional files are recorded on the recording medium in order to prevent the space on the recording medium from being wasted to keep the recordable space as much as possible.

According to an embodiment of the present invention, there is provided an information recording apparatus including recording means for recording a file and filesystem information on a recording medium; filesystem-information generating means for generating the filesystem information for every application software program using the file; and operation control means for controlling the operation of the recording means so as to allocate the filesystem information, generated for every application software program using the file by the filesystem-information generating means, to virtual addresses as one file. When the file is to be recorded by the recording means, the operation control means controls the recording means so as to update the filesystem information corresponding to the application software program using the file to be recorded and to record the updated filesystem information on the recording medium.

According to another embodiment of the present invention, there is provided an information recording method including the steps of recording a file and filesystem information on a recording medium; generating the filesystem information for every application software program using the file; and controlling the operation in the recording step so as to allocate the filesystem information, generated for every application software program using the file in the step of generating the filesystem information, to virtual addresses as one file. When the file is to be recorded in the recording step, the recording step is controlled in the operation controlling step so as to update the filesystem information corresponding to the application software program using the file to be recorded and to record the updated filesystem information on the recording medium.

According to another embodiment of the present invention, there is provided a recording medium on which the file and filesystem information are recorded in the information recording method.

According to another embodiment of the present invention, there is provided a program storage medium that stores a computer-readable program including the steps of controlling recording of a file and filesystem information on a recording medium; controlling generation of the filesystem information for every application software program using the file; and controlling the operation in the recording controlling step so as to allocate the filesystem information, generated for every application software program using the file in the step of controlling the generation of the filesystem information, to virtual addresses as one file. When the file is to be recorded in the recording controlling step, the recording controlling step is controlled in the operation controlling step so as to update the filesystem information corresponding to the application software program using the file to be recorded and to record the updated filesystem information on the recording medium.

According to another embodiment of the present invention, there is provided a program causing a computer to execute the steps of controlling recording of a file and filesystem information on a recording medium; controlling generation of the filesystem information for every application software program using the file; and controlling the operation in the recording controlling step so as to allocate the filesystem information, generated for every application software program using the file in the step of controlling the generation of the filesystem information, to virtual addresses as one file. When the file is to be recorded in the recording controlling step, the recording controlling step is controlled in the operation controlling step so as to update the filesystem information corresponding to the application software program using the file to be recorded and to record the updated filesystem information on the recording medium.

The information recording apparatus, the information recording method, and the program, according to the embodiments of the present invention, are controlled so as to record a file and filesystem information on a recording medium, to generate the filesystem information for every application software program using the file, and to allocate the filesystem information generated for every application software program using the file to the virtual addresses as one file. The information recording apparatus, the information recording method, and the program according to the embodiments of the present invention are also controlled, when the file is to be recorded, so as to update the filesystem information corresponding to the application software program using the file to be recorded and to record the updated filesystem information on the recording medium.

The information recording apparatus according to an embodiment of the present invention may be an independent apparatus or a block performing the information recording process.

According to the present invention, it is possible to prevent the space on the recording medium from being wasted to keep the recordable space as much as possible by minimizing the space occupied by the recorded file system information when additional files are recorded on the recording medium.

BRIEF DESCRIPTION OF THE DRAWINGS

FIG. 8 is a diagram illustrating a procedure to access to files based on UDF;

FIG. 9 is another diagram illustrating the procedure to access to the files based on the UDF;

FIG. 20 illustrates the recording process by the recording-playback unit in FIG. 18.

DESCRIPTION OF THE PREFERRED EMBODIMENTS

An information recording apparatus, according to an embodiment of the present invention, includes a recorder (for example, a writer 73 in FIG. 3) for recording a file and filesystem information on a recording medium; a filesystem-information generator (for example, a filesystem information generator 62 in FIG. 3) for generating the filesystem information for every application software program using the file; and an operation controller (for example, a control section 51 in FIG. 3) for controlling the operation of the recorder so as to allocate the filesystem information, generated for every application software program using the file by the filesystem-information generator, to virtual addresses as one file. When the file is to be recorded by the recorder, the operation controller controls the recorder so as to update the filesystem information corresponding to the application software program using the file to be recorded and to record the updated filesystem information on the recording medium.

Figure 13:
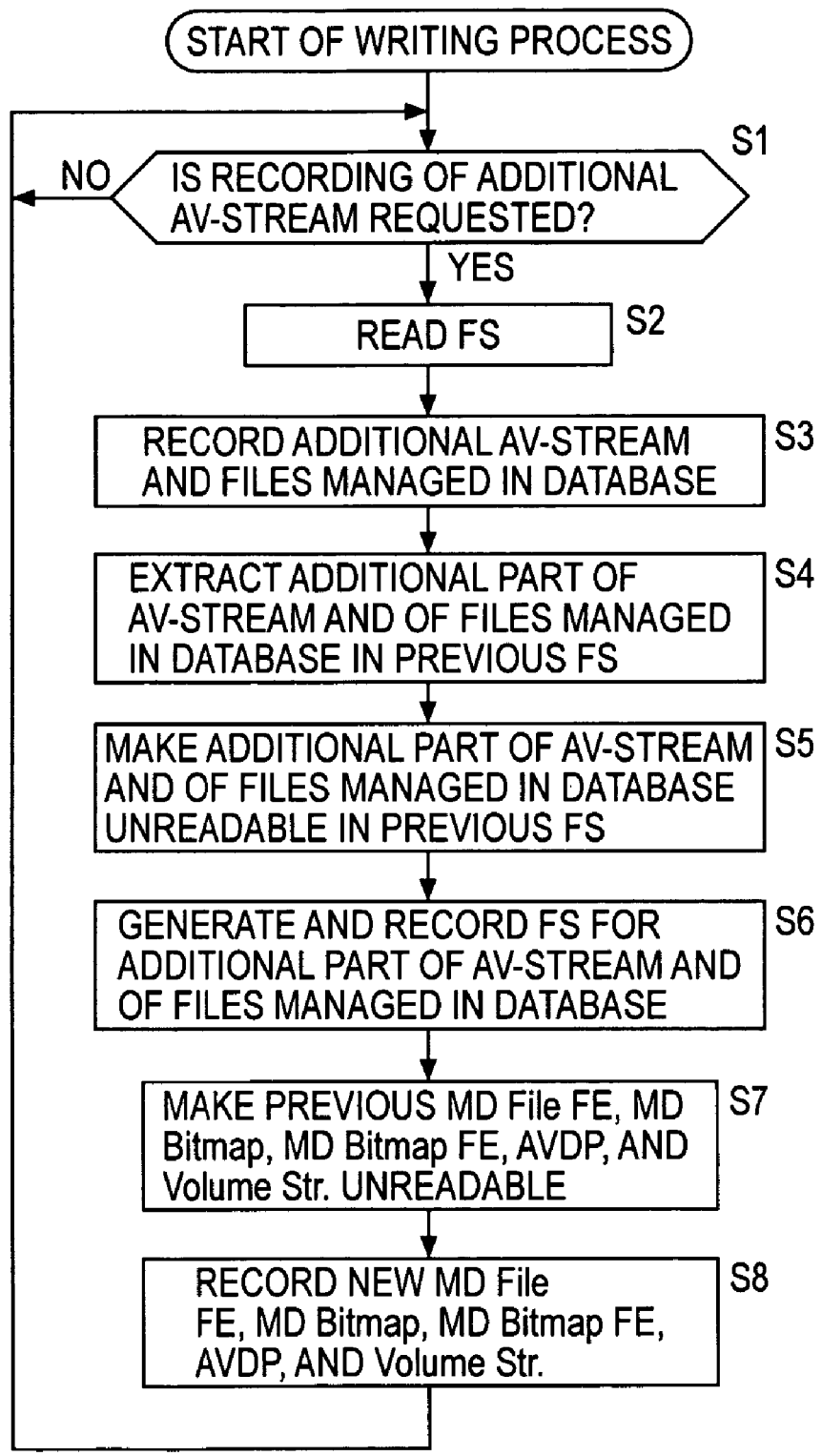
FIG. 13 is a flowchart showing a recording process by the recording-playback unit in FIG. 3.

An information recording method, according to another embodiment of the present invention, includes the steps of recording a file and filesystem information on a recording medium (for example, Step S3 in the flowchart in FIG. 13); generating the filesystem information for every application software program using the file (for example, Step S6 in the flowchart in FIG. 13); and controlling the operation in the recording step so as to allocate the filesystem information, generated for every application software program using the file in the step of generating the filesystem information, to virtual addresses as one file (for example, Step S6 in the flowchart in FIG. 13). When the file is to be recorded in the recording step, the recording step is controlled in the operation controlling step so as to update the filesystem information corresponding to the application software program using the file to be recorded and to record the updated filesystem information on the recording medium.

Since a program storage medium and a program, according to embodiments of the present invention, are similar to the information recording method, a description is omitted herein.

Figure 2:
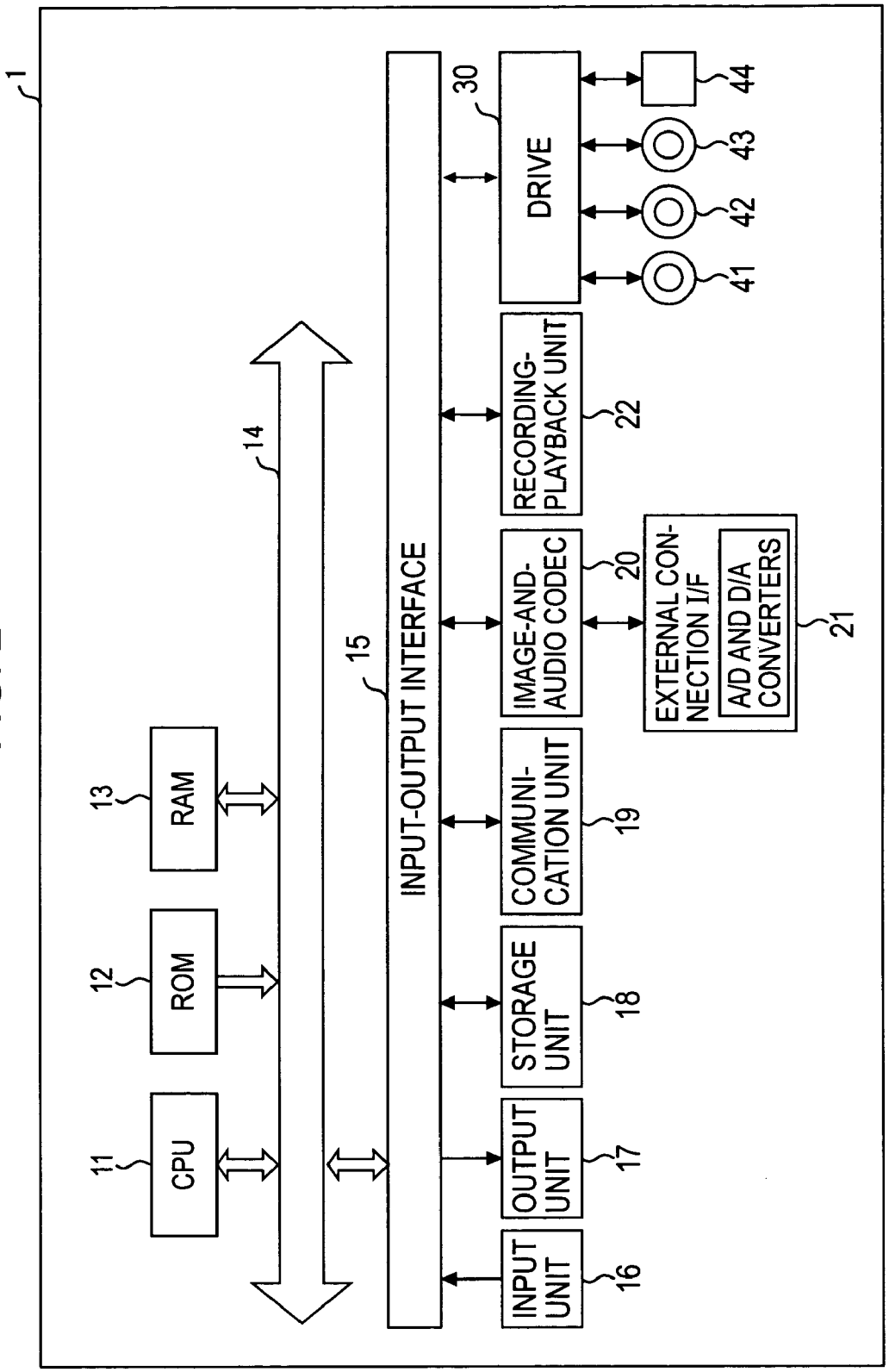
FIG. 2 shows the structure of a recording-playback apparatus according to an embodiment of the present invention.

FIG. 2 shows the structure of a recording-playback apparatus 1 according to an embodiment of the present invention.

A central processing unit (CPU) 11 performs a variety of processing in accordance with programs stored in a read only memory (ROM) 12 or a storage unit 18. A random access memory (RAM) 13 appropriately stores programs executed by the CPU 11, a variety of data, and so on. The CPU 11, the ROM 12, and the RAM 13 are connected to each other via a bus 14.

An input-output interface 15 is connected to the CPU 11 via the bus 14. An input unit 16 including a keyboard, a mouse, a microphone, etc. and an output unit 17 including a display device, a speaker, etc. are connected to the input-output interface 15. The CPU 11 performs the variety of processing in response to instructions input with input unit 16. The CPU 11 outputs images and audios acquired in the processing to the output unit 17.

The storage unit 18 connected to the input-output interface 15 is, for example, a hard disk and stores programs executed by the CPU 11 and a variety of data. A communication unit 19 communicates with information processing apparatuses, such as external servers, via a network typified by the Internet or an intranet.

The CPU 11 reads out the programs stored in the storage unit 18 to perform the corresponding processing. The storage unit 18 stores, for example, an OS, which is a basic program, and drivers. The programs stored in the storage unit 18 may be acquired through the communication unit 19.

An image-and-audio compressor-decompressor (CODEC) 20 decompresses an image or audio file in a predetermined format, the image or audio file being read from a magnetic disk 41, an optical disk 42, a magneto-optical disk 43, or a semiconductor memory 44, which are connected to a drive 30, or from a recording medium 81 in a recording-playback unit 22 (FIG. 3) and being compressed in a predetermined compression format, and supplies the decompressed file to an external connection interface (I/F) 21 or the output unit 17. The image-and-audio CODEC 20 compresses an image or audio signal supplied from the input unit 16 or the external connection I/F 21 in a predetermined format and causes the magnetic disk 41, the optical disk 42, the magneto-optical disk 43, or the semiconductor memory 44, which are connected to the drive 30, or the recording medium 81 in the recording-playback unit 22 (FIG. 3) to record the compressed signal.

The recording-playback unit 22 records predetermined information on the recording medium 81 (FIG. 3), such as a Blu-ray disc™, which is a magneto-optical recording medium, or reads out the information recorded on the recording medium 81. The structure of the recording-playback unit 22 will be described in detail below with reference to FIG. 3.

The drive 30 connected to the input-output interface 15 drives the loaded magnetic disk 41, optical disk 42, magneto-optical disk 43, or semiconductor memory 44 to acquire programs or data recorded therein. The acquired programs and data are transferred to the storage unit 18, if required, and are stored in the storage unit 18.

The operation of the recording-playback apparatus 1 in FIG. 2 will be described next.

When the CPU 11 is instructed to record input data supplied from the input unit 16 through the external connection I/F 21, the CPU 11 controls the image-and-audio CODEC 20 in accordance with the programs stored in the ROM 12, the RAM 13, or the storage unit 18 so as to compress the input data in a predetermined compression format, supplies the compressed data to the recording-playback unit 22, and stores the input data on the recording medium 81 (FIG. 3) described below.

When the CPU 11 is instructed to play back the data recorded on the recording medium 81 loaded in the recording-playback unit 22, the CPU 11 controls the recording-playback unit 22 in accordance with the programs stored in the ROM 12, the RAM 13, or the storage unit 18 so as to play back the data recorded on the recording medium 81 and supplies the data to the image-and-audio CODEC 20. The CPU 11 controls the image-and-audio CODEC 20 so as to decompress the input data in a predetermined decompression format, and externally outputs the decompressed data through the external connection I/F 21 or causes the output unit 17 to display the image data or to output the audio data.

The structure of the recording-playback unit 22 will be described in detail next with reference to FIG. 3.

A control section 51 controls the entire operation of the recording-playback unit 22. The control section 51 controls a recording section 52 in accordance with a control signal supplied from the CPU 11 to cause a recording-playback block 53 to record the information on the recording medium 81, or controls a playback section 54 to cause the recording-playback block 53 to read out the information recorded on the recording medium 81.

A filesystem information generator 62 in the control section 51 divides files including the input data into groups for every attribute based on the attributes of the files containing the input data to determine the recording positions of the files on the recording medium 81, and records the files. The filesystem information generator 62 generates filesystem information based on the recorded information, supplies the generated filesystem information to the recording section 52, and records the filesystem information on the recording medium 81.

More specifically, the filesystem information generator 62 records the input files so as to be allocated to virtual addresses for every application software program used (for every attribute) (groups the files and records the grouped files so as to be allocated to the corresponding virtual addresses). The filesystem information generator 62 generates the filesystem information for every application software program, supplies the generated filesystem information to the recording section 52, and records the filesystem information for every application software program on the recording medium 81.

When an additional file is to be recorded, the filesystem information generator 62 updates only the filesystem information corresponding to the application software program using the file to be recorded and records the additional file. The area where the previous filesystem information has been recorded is made unreadable.

A filesystem information recognizer 61 in the control section 51 reads out filesystem information supplied from the playback section 54 and reads out a predetermined file based on the readout filesystem information.

The recording-playback block 53 is controlled by a writer 73 or a reader 91, and physically records information on the recording medium 81 and/or plays back the information recorded on the recording medium 81. The recording medium 81 is a medium on which information can be mechanically, optically, magnetically, or magneto-optically recorded. The recording medium 81 may be any disc-type recording medium as long as data in any format can be recorded thereon or the data recorded thereon can be played back. The recording medium 81 may be a rewritable medium (for example, a Blu-ray Disc-Rewritable (BD-RE), a digital versatile disc-rewritable (DVD-RW), or a digital versatile disc-random access memory (DVD-RAM)) or may be a write-once medium (for example, a Blu-ray Disc-Recordable (BD-R), a digital versatile disc-recordable (DVD-R), or a digital versatile disc-read only memory (DVD-ROM)). Accordingly, the recording-playback block 53 may be any device capable of recording data on the recording medium 81 or playing back the data on the recording medium 81. Particularly, the recording-playback block 53 is useful for a high-capacity recording medium, such as an optical disk that records or plays back data by using blue-violet laser light.

An error correction code (ECC) encoder 71 adds an error correction code to the input data, encodes the data, and supplies the encoded data to a modulator 72. The modulator 72 modulates the data supplied from the ECC encoder 71 and supplies the modulated data to the writer 73. The writer 73 supplies the data supplied from the modulator 72 to the recording-playback block 53 and causes the recording-playback block 53 to write the data on the recording medium 81.

The reader 91 in the playback section 54 reads out the information recorded on the recording medium 81. A demodulator 92 demodulates the data read out from the recording medium 81 by the reader 91 and supplies the demodulated data to an ECC decoder 93. The ECC decoder 93 divides the data supplied from the demodulator 92 into normal files (for example, audio-visual (AV) stream data) and the filesystem information to output the normal files as output data and to supply the filesystem information to the control section 51.

The management structure of files containing the input data, grouped and managed by the filesystem information generator 62, will be described below with reference to FIG. 4. The files are basically recorded on the recording medium 81 based on the universal disk format (UDF). Accordingly, each file is recorded on the recording medium 81 based on the UDF in accordance with the management structure described below.

Figure 4:
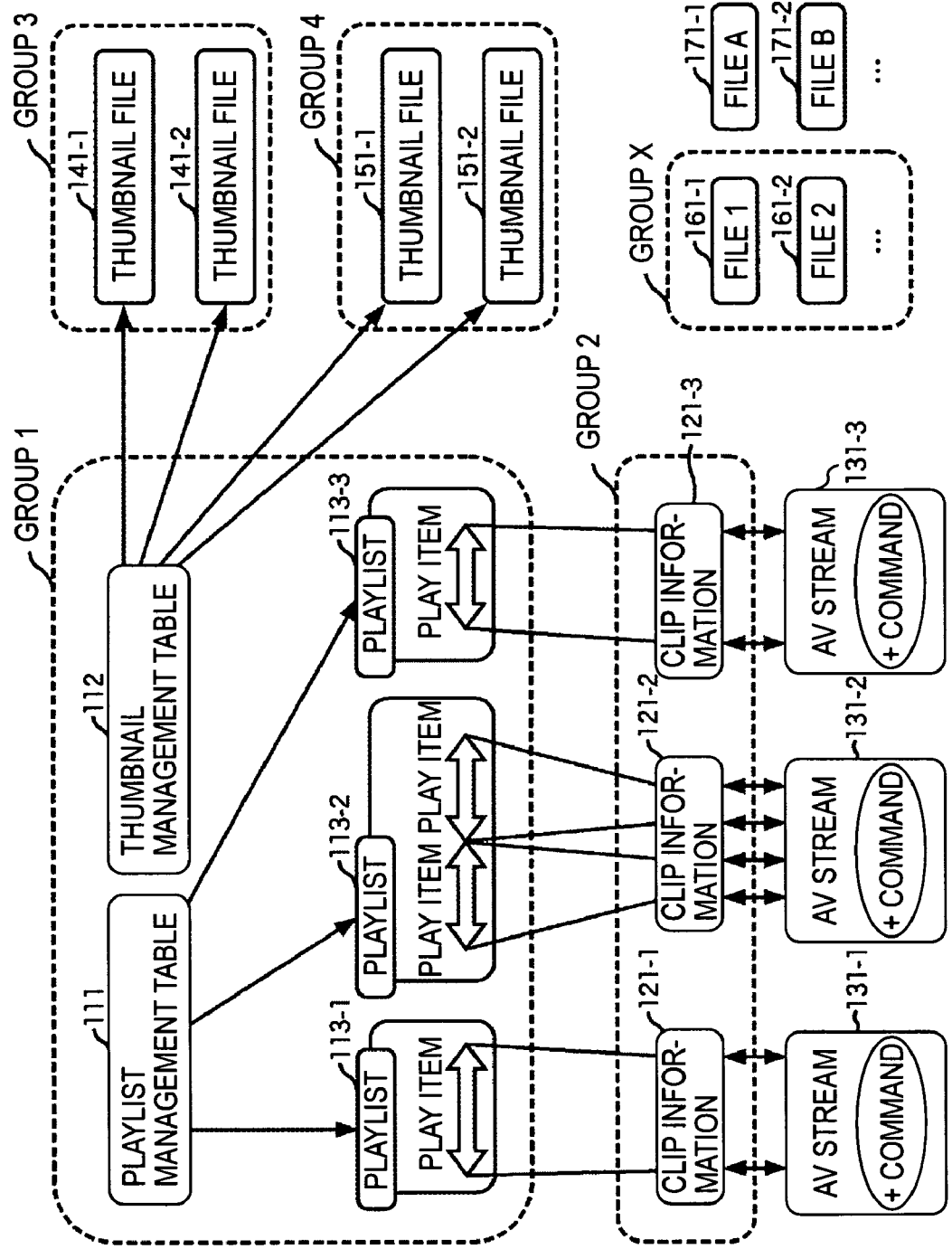
FIG. 4 shows a management structure managed in groups.

FIG. 4 shows an example in which various files are managed to record the AV stream data on a rewritable recording medium. The management structure conforms to the Blu-ray Disc Rewritable™ format (although the management structure conforms to the Blu-ray Disc Rewritable™ format, the recording format is based on the UDF). Referring to FIG. 4, three layers, that is, a content management layer, a playlist layer, and a clip layer are shown from the top. This management structure can also be used for the Blu-ray Disc Recordable™.

The content management layer includes a playlist management table 111 and a thumbnail management table 112. The playlist management layer includes playlists 113-1 to 113-3. The clip layer includes clip information 121-1 to 121-3. When there is no need to distinguish between the playlists 113-1 to 113-3 and between the clip information 121-1 to 121-3 in the following description, the playlists 113-1 to 113-3 are referred to as a playlist 113 and the clip information 121-1 to 121-3 is referred to as clip information 121. The same applies to other items.

The file of an AV stream 131 and the file (having the attribute information of the AV stream) of the clip information 121 are collectively referred to as a clip. The AV stream 131 is, for example, moving picture experts group-transport stream (MPEG-TS) data and has a structure in which information including videos, audios, and captions is multiplexed. Command information for controlling the playback may also be multiplexed in the AV stream 131. FIG. 4 shows the example in which the command information is multiplexed.

Each playlist is structured to have a plurality of play items, each play item referring to a certain range of a clip by using the playback start point and the playback end point. One playlist is capable of continuously playing back a plurality of playback sequences. The playlist management table 111 used for displaying a list of playlists to a user, the thumbnail management table 112 used for displaying thumbnails, and thumbnail files 141-1 and 141-2 and thumbnail files 151-1 and 151-2 corresponding to the respective thumbnails are provided.

A pair of one AV stream 131 and its auxiliary information is presumed as one object and is referred to as the clip. The file of the AV stream is called an AV stream file and the auxiliary information is called the clip information 121.

Although the file used in a computer or the like is generally processed as a sequence of bytes, the content of the AV stream 131 is decompressed on a time base and the playlist 113 specifies the access points in the clip information 121 by mainly using timestamps. When the timestamps of the access points in the clip are specified by the playlist 113, the clip information 121 is used for searching for the address information (data byte position) where decoding of the stream is to be started in the AV stream 131.

The playlist 113 is introduced for the purpose of selecting a playback section which the user wants to watch from the clip and easily editing the selected playback section. One playlist 113 is a collection of playback sections in the clip. One playback section in a clip is called a play item, which is represented by using a pair of an IN point and an OUT point on the time base. Accordingly, the playlist is a collection of play items.

Referring to FIG. 4, the files are grouped in the following manner in accordance with the frequency in use and update of the files and the maximum total sizes of the files in the groups. The playlist management table 111, the thumbnail management table 112, and the playlist 113 are classified as a group 1, the clip information 121 is classified as a group 2, the thumbnail files 141-1 and 141-2 for menus are classified as a group 3, and the thumbnail files 151-1 and 151-2 for marking are classified as a group 4.

The files grouped in the above manner include management data required for playing back the AV stream 131. Extracting such management data and collectively managing the extracted management data allows the management data to be rapidly read out. As a result, it is possible to play back the AV stream data at high speed.

Although the example in which the files including the management data for the AV stream 131 are divided into groups is described above, files that are not defined in the Blu-ray Disc Rewritable format may be divided into groups. Referring to FIG. 4, a group X is defined as a group of files other than the files including the management data for the AV stream 131, and files 161-1 and 161-2 belong to the group X. Files 171-1 and 171-2 are not grouped. Since the AV stream 131 is not the management data, the AV stream 131 is not grouped for management.

Figure 5:
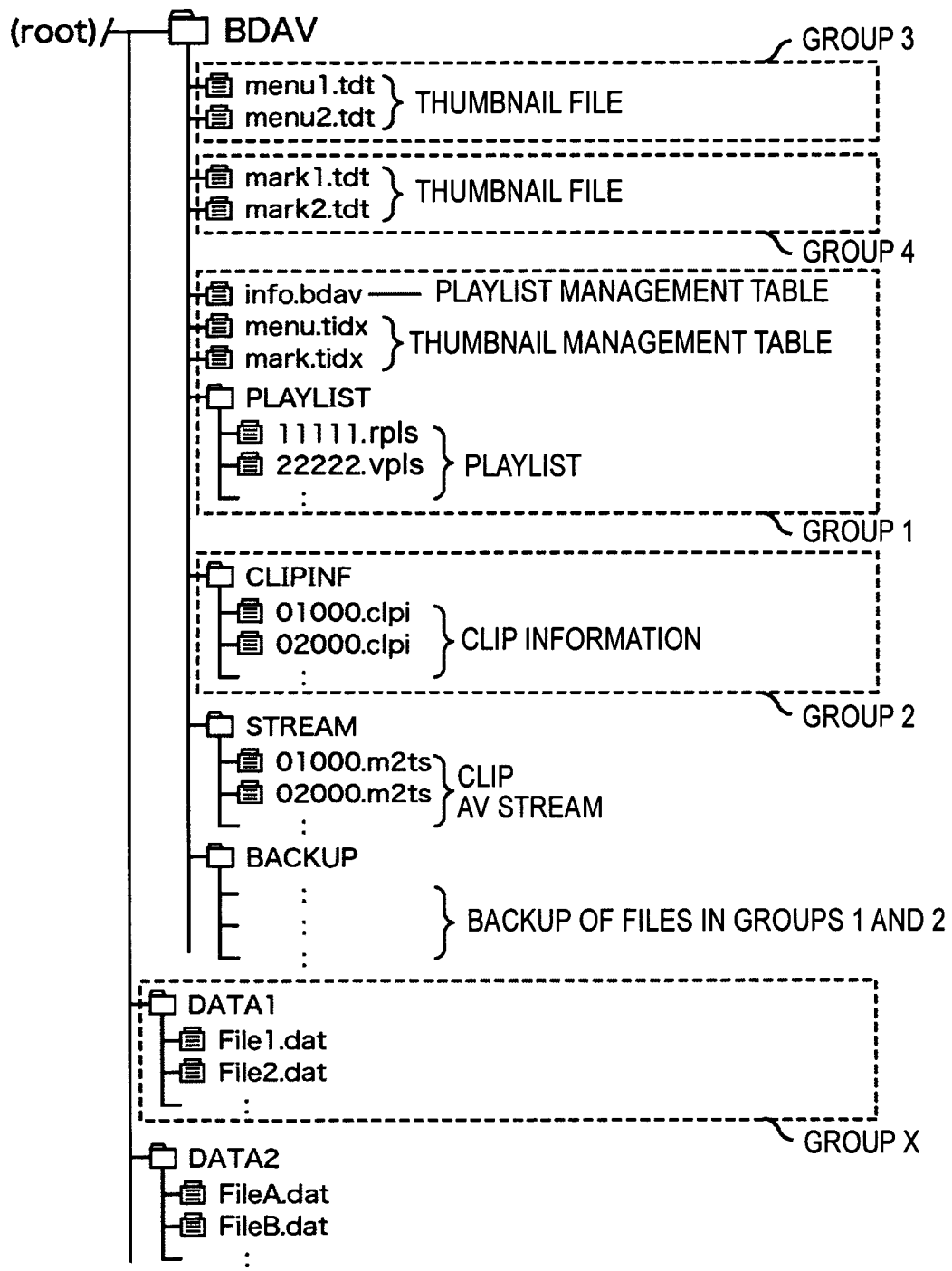
FIG. 5 shows the structure of directories and files in the management structure in FIG. 4.

FIG. 5 shows an example of the directory structure of Blu-ray Disc Audio Visual (BDAV) information, which is recorded on the recording medium 81 and which is defined in the Blu-ray Disc Rewritable (BD-RE) format. Although directories other than the directories shown in FIG. 5 may be created under the "root" directory, such directories are ignored in BDAV-ready recorders-players. The directory structure in FIG. 5 is supported in the Blu-ray Disc Recordable (BD-R).

As shown in FIG. 5, the "root" directory is the top directory.

All the files and directories defined in a BDAV application format are recorded in a "BDAV" directory. The "BDAV" directory includes directories described below.

The database files of the playlists 113 are recorded in a "PLAYLIST" directory. The "PLAYLIST" directory is created even if no playlist 113 exists.

The database of clips is recorded in a "CLIPINF" directory. The "CLIPINF" directory is created even if no clip exists.

The AV stream files are recorded in a "STREAM" directory. The "STREAM" directory is created even if no AV stream file exists.

The backup files for files in the groups 1 and 2 are recorded in a "BACKUP" directory. The "BACKUP" directory is created even if no file exists in the groups 1 and 2.

Two kinds of playlist files, that is, a real playlist file and a virtual playlist file, are recorded in the "PLAYLIST" directory. Referring to FIG. 5, files 11111.rpls and 22222.vpls are recorded in the "PLAYLIST" directory. A file represented as "xxxxx.rpls" has information concerning one real playlist, and one "xxxxx.rpls" file is created for every playlist. "Xxxxx" denotes five numeric characters in a range from zero to nine.

A file represented as "yyyyy.vpls" has information concerning one virtual playlist, and one "yyyyy.vpls" file is created for every playlist. The name of the file is "yyyyy.vpls". "Yyyyy" denotes five numeric characters in a range from zero to nine.

The real playlist is presumed to share the stream part of the clip referred to by the real playlist. In other words, the real playlist occupies, in the disc, the data space corresponding to the AV stream part of the clip referred to by the real playlist. When the AV stream is recorded as a new clip, a real playlist referring to the range in which the overall clip can be played back is created. When part of the playback range of the real playlist is deleted, the data in the stream part of the clip referred to by the real playlist is also deleted.

The virtual playlist is presumed not to share the data in the clip. Even when the virtual playlist is modified or deleted, no change occurs in the clip. The real playlist and the virtual playlist are collectively referred to as the playlist in this specification.

The "CLIPINF" directory has one file for every AV stream file. Referring to FIG. 5, the "CLIPINF" directory has files 01000.clpi and 02000.clpi.

The file represented by "zzzzz.clpi" includes the clip information 121 corresponding to one AV stream 131. The name of the file is "zzzzz.clpi" and "zzzzz" denotes five numeric characters in a range from zero to nine.

The "STREAM" directory has files of the AV streams. Referring to FIG. 5, the "STREAM" directory has files 01000.m2ts and 02000.m2ts.

The file represented by "zzzzz.m2ts" is the file of the AV stream 131. The name of the file is "zzzzz.m2ts" and "zzzzz" denotes five numeric characters in a range from zero to nine. The same five numeric characters "zzzzz" are assigned to the file of one AV stream 131 and to the clip information 121 corresponding to the AV stream 131 as the file names.

Files menu1.tdt and menu2.tdt corresponding to the thumbnail files 141-1 and 141-2, respectively, and files mark1.tdt and mark2.tdt corresponding to the thumbnail files 151-1 and 151-2, respectively, are created immediately under the "BDAV" directory. A file info.bdav corresponding to playlist management table 111 and files menu.tidx and mark.tidx corresponding to the thumbnail management table 112 are also created immediately under the "BDAV" directory.

Directories "DATA1" and "DATA2" are created immediately under the "root" directory. Files File1.dat, File2.dat, . . . corresponding to the files 161-1, 161-2, . . . are created under the "DATA1" directory. Files FileA.dat, FileB.dat, . . . corresponding to the files 171-1, 171-2, . . . are created under the "DATA2" directory.

In the files and directories managed in the directory structure shown in FIG. 5, the menu1.tdt and menu2.tdt files corresponding to the thumbnail files 141-1 and 141-2 are classified and stored as the group 3; the mark1.tdt and mark2.tdt files corresponding to the thumbnail files 151-1 and 151-2 are classified and stored as the group 4; the info.bdav file corresponding to the playlist management table 111, the menu.tidx and mark.tidx files corresponding to the thumbnail management table 112, and the 11111.rpls and 22222.vpls files in the "PLAYLIST" directory are classified and stored as the group 1; and the 01000.clpi and 02000.clpi files in the "CLIPINF" directory are classified and stored as the group 2, as shown in FIG. 4.

In addition to the above files managed in the groups, the File1.dat and File2.dat files corresponding to the files 161-1 and 161-2, in the "DATA1" directory, are classified as the group X.

Figure 6:
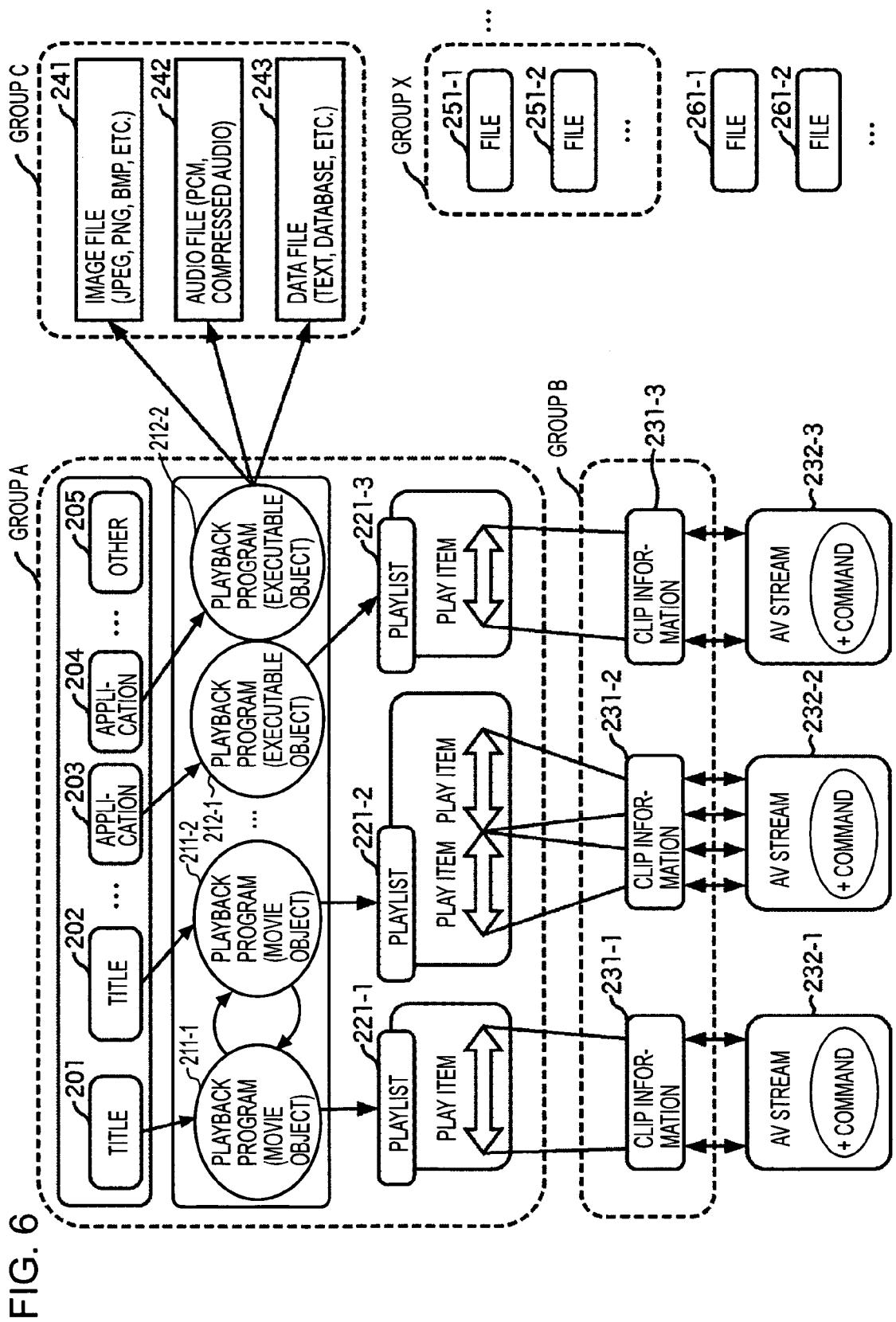
FIG. 6 shows another management structure managed in groups.
Figure 7:
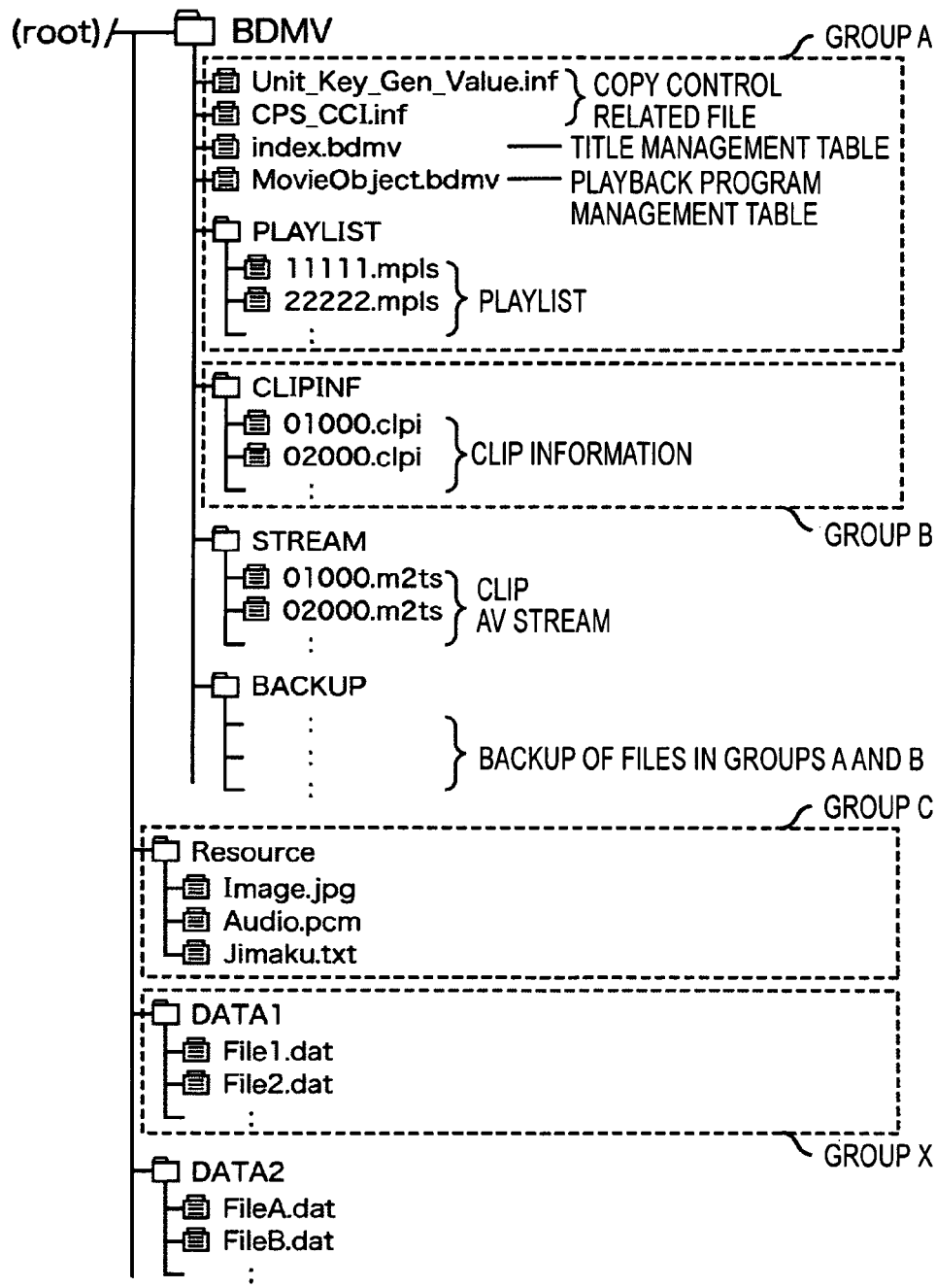
FIG. 7 shows the structure of directories and files in the management structure in FIG. 6.

The management structure for the grouping, adopted when the AV stream data is recorded on the recording medium 81 based on the UDF in the Blu-ray Disc Rewritable (rewritable recording medium) format, is shown in FIGS. 4 and 5. In contrast, FIGS. 6 and 7 show an example of the management structure (logical format) for the grouping in a Blu-ray Disc ROM (read-only recording medium). High-density (HD) movie content is recorded in the example in FIG. 6.

Since playlists 221-1 to 221-3, clip information 231-1 to 231-3, AV streams 232-1 to 232-3, files 251-1 and 251-2, and files 261-1 and 261-2 in FIG. 6 are similar to the playlists 113-1 to 113-3, the clip information 121-1 to 121-3, the AV streams 131-1 to 131-3, the files 161-1 and 161-2, and the files 171-1 and 171-2 in FIG. 4, a description of such items in FIG. 6 is omitted herein.

Referring to FIG. 6, a playback program layer including playback programs (movie objects) 211-1 and 211-2 and a title layer including titles 201 and 202 exist above clip information 231 and a playlist 221 similar to the clip information 121 and the playlist 113 described above with reference to FIG. 4. A playback program (movie object) 211 specifies the playlist to be played back and programmably supplies functions required for presenting the HD movie content, including response to an operation of the user, jumping between the title 201 and the title 202, and branching of a playback sequence.

The user recognizes the titles 201 and 202 to use the titles 201 and 202 as indexes in use for starting playback of the content. Each of the titles 201 and 202 is structured to specify one movie object to be executed. In addition to the normal titles, titles to be automatically played back at the beginning and titles used for displaying menus may also be provided.

Application software programs (applications) 203 and 204 invoke playback programs (executable objects) 212-1 and 212-2, respectively, to execute games, which are extended applications, or Web content. A playback program 212 uses the playlist in some cases and does not use the playlist in other cases. The playback program 212 is capable of referring to an arbitrary image file 241, audio file 242, or data file 243 in the application software programs 203 and 204.

The titles 201 and 202 each indicating the HD movie content and the applications 203 and 204 may be increased in number. Referring to FIG. 6, such titles and applications are denoted by Other 205. In addition, the titles 201 and 202 and the applications 203 and 204 may be mixed and recorded on the recording medium 81. FIG. 6 shows a state in which the titles 201 and 202, the applications 203 and 204, and the Other 205 are mixed.

Also in FIG. 6, the files are grouped in the following manner in accordance with the frequency in use and update of the files and the maximum total sizes of the files in the groups, as in FIG. 4. The titles 201 and 202, the applications 203 and 204, the Other 205, the playback programs 211-1, 211-2, 212-1, and 212-2, and the playlists 221-1 to 221-3 are classified as a group A; the clip information 231 is classified as a group B; and the image file 241, the audio file 242, and the data file 243 are classified as a Group C.

The groups A, B, and C in FIG. 6 are grouped for convenience, as in the groups 1, 2, 3, and 4 in FIG. 4, and the groups A, B, and C are similar to the groups 1, 2, 3, and 4 in the context of the groups of the files in the processing.

FIG. 7 shows an example of the directory structure of Blu-ray Disc Movie (BDMV) information, which is recorded on the recording medium 81 and which is defined in a Blu-ray Disc ROM (BD-ROM) format. Although directories other than the directories shown below may be created under the "root" directory, such directories are ignored in BDMV-ready recorders-players.

As shown in FIG. 7, the "root" directory is the top directory.

All the files and directories defined in a BDMV application format are recorded in a "BDMV" directory. The "BDMV" directory includes directories described below.

The database files of the playlist 221 are recorded in a "PLAYLIST" directory. The "PLAYLIST" directory is created even if no playlist 221 exists.

The database of clips is recorded in a "CLIPINF" directory. The "CLIPINF" directory is created even if no clip exists.

The AV stream files are recorded in a "STREAM" directory. The "STREAM" directory is created even if no AV stream file exists.

The backup files for files in the groups A and B are recorded in a "BACKUP" directory. The "BACKUP" directory is created even if no file exists in the groups A and B.

Referring to FIG. 7, files 11111.mpls and 22222.mpls are recorded in the "PLAYLIST" directory. A file represented as "xxxxx.mpls" has information concerning one movie playlist, and one "xxxxx.mpls" file is created for every movie playlist. "Xxxxx" denotes five numeric characters in a range from zero to nine.

The "CLIPINF" directory has one file for every AV stream file. Referring to FIG. 7, the "CLIPINF" directory has files 01000.clpi and 02000.clpi.

The file represented by "zzzzz.clpi" includes the clip information 231 corresponding to one AV stream 232. The name of the file is "zzzzz.clpi" and "zzzzz" denotes five numeric characters in a range from zero to nine.

The "STREAM" directory has files of the AV streams. Referring to FIG. 7, the "STREAM" directory has files 01000.m2ts and 02000.m2ts.

The file represented by "zzzzz.m2ts" is the file of the AV stream 232. The name of the file is "zzzzz.m2ts" and "zzzzz" denotes five numeric characters in a range from zero to nine. The same five numeric characters "zzzzz" are assigned to the file of one AV stream 232 and to the clip information 231 corresponding to the AV stream 232 as the file names.

Copy control related files Unit_Key_Gen_Value.inf and CPS_CCI.inf are created immediately under the "BDMV" directory. A file index.bdmv for a title management table and a file MovieObject.bdmv for a playback program management table are also created immediately under the "BDMV" directory.

Directories "Resource", "DATA1", and "DATA2" are created immediately under the "root" directory. Although these directories are not essential in the Blu-ray Disc ROM format, these directories are added as examples of the directories storing extended data required for some pieces of content. Files Image.jpg, Audio.pcm and Jimaku.txt corresponding to the image file 241, the audio file 242, and the data file 243, respectively, which are managed in one group, are created under the "Resource" directory. Files File1.dat, File2.dat, ... corresponding to the files 251-1, 252-2, ... are created under the "DATA1" directory. Files FileA.dat, FileB.dat, ... corresponding to the files 261-1, 261-2, ... are created under the "DATA2" directory.

In the files and directories managed in the directory structure shown in FIG. 7, the Unit_Key_Gen_Value.inf file, the CPS_CCI.inf file, the index.bdmv file, the MovieObject.bdmv file, and the 11111.mpls and 22222.mpls files in the "PLAYLIST" directory are classified and stored as the group A; the 01000.clpi and 02000.clpi files in the "CLIPINF" directory are classified and stored as the group B; and the Image.jpg, Audio.pcm, Jimaku.txt files in the "Resource" directory are classified and stored as the group C.

In addition to the above files managed in the groups, the File1.dat, File2.dat files, ... corresponding to the files 251-1, 251-2, ..., in the "DATA1" directory, are classified as the group X.

Before describing a recording process according to an embodiment of the present invention, a procedure to access to files based on the UDF in related art will be described next with reference to FIGS. 8 and 9.

FIG. 8 shows an example of the volume structure based on the UDF. FIG. 9 shows the content of "File Structure and Files". Access to "root/BDMV/Unit_Key_Gen_Value.inf" file in FIG. 7 is exemplified here.

Information concerning a logical volume and information concerning the start point of analysis of the file structure recorded in a partition are recorded in the volume structure in FIG. 8. Referring to FIG. 8, logical sector numbers (LSNs) are shown in the leftmost column, a structure is shown in the second column from the left, descriptors are shown in the second column from the right, and the logical block numbers (LBNs) are shown in the rightmost column. Referring to FIG. 9, logical block numbers (LBNs) are shown in the leftmost column, a structure is shown in the central column, and descriptors are shown in the rightmost column.

The address information in a volume is represented as the LSNs and the address information in a partition is represented as the LBNs. When a plurality of partitions exists in a volume, the information concerning the plurality of partitions is recorded in "Logical Volume Descriptor".

Only items necessary for the procedure are shown in FIGS. 8 and 9. A description of items unnecessary for the procedure is appropriately omitted herein.

First, anchor information ("Anchor Volume Descriptor Pointer") of "Anchor-1" having an LSN of 256, numbered "1" in FIG. 8, is analyzed to acquire the position of "Main Volume Descriptor Sequence" numbered "2". Next, the "Main Volume Descriptor Sequence" having LSNs from 32 to 47, numbered "2", is analyzed. The "Main Volume Descriptor Sequence" includes "Primary Volume Descriptor", "Implementation Use Volume Descriptor", "Partition Descriptor", "Logical Volume Descriptor", "Unallocated Space Descriptor", "Terminating Descriptor", and "Trailing Logical Sectors". The "Primary Volume Descriptor" stores information used for identifying the volume, the "Implementation Use Volume Descriptor" stores information indicating the compatibility, the "Partition Descriptor" stores information used for identifying the partitions, the "Logical Volume Descriptor" stores information indicating the position of the logical partitions, the "Unallocated Space Descriptor" stores information indicating the unused area, the "Terminating Descriptor" stores information indicating the terminating position of the area, and the "Trailing Logical Sectors" stores information concerning the remaining areas.

Among the above information, the position of "Logical Volume Integrity Sequence" described in the "Logical Volume Descriptor" having an LSN of 35, numbered 3 in FIG. 8, and the position of the target partition, and the position of "File Set Descriptor" in the partition are acquired.

"Logical Volume Integrity Sequence" having an LSN of 48, numbered 4, is analyzed and the integrity of the volume information is checked. If there is no problem with the integrity, the inside of the partition of "File Structure and Files" having LSNs from 272 to LSNall-272, numbered 5, is analyzed. Access to the target partition is initiated in the above manner.

Subsequently, information concerning the "root" directory stored in "File Set Descriptor" having an LBN of (A+1), numbered 11 in FIG. 9, is analyzed. The position of the file entry of the "root" directory (shown by "FE (Root Directory)" in FIG. 9) having an LBN of (A+3), numbered 12, is acquired.

The file entry of the "root" directory (shown by "FE (Root Directory)" in FIG. 9) having an LBN of (A+3), numbered 12, is analyzed to acquire the position (SBN=A+4) where the information concerning the "root" directory is described. Next, the file identifier descriptor (FID) of the "BDMV" directory, numbered 13, in the information concerning the "root" directory, is analyzed to acquire the position (LBN=A+5) of the file entry (FE) of the "BDMV" directory (shown by "FE (BDMV)" in FIG. 9), numbered 14.

The file entry of the "BDMV" directory, numbered 14, is analyzed to acquire the position (LBN=A+9) where the information concerning the "BDMV" directory is recorded.

The information concerning the "BDMV" directory is acquired, and the file identifier descriptor (FID) of "Unit_Key_Gen_Value.inf" file, numbered 15, in the "BDMV" directory is analyzed to acquire the position of the file entry of the "Unit_Key_Gen_Value.inf" file. The file entry of "Unit_Key_Gen_Value.inf" file, numbered 16, is analyzed to acquire the position where the data in the "Unit_Key_Gen_Value.inf" file is recorded in order to access to the address where the data in the "Unit_Key_Gen_Value.inf" file is recorded to acquire the target data. The data in the "root/BDMV/Unit_Key_Gen_Value.inf" file, numbered 17, is acquired in the above manner.

When the metadata partition introduced in the UDF 2.50 is used, the "File Set Descriptor", numbered 11; the file entry (FE) of the "root" directory, numbered 12; the file identifier descriptor (FID) of the "BDMV" directory, numbered 13; the file entry (FE) of the "BDMV" directory, numbered 14; the file identifier descriptor (FID) of the "Unit_Key_Gen_Value.inf" file in the "BDMV" directory, numbered 15; and the file entry (FE) of the "Unit_Key_Gen_Value.inf" file, numbered 16, are allocated to virtual addresses in the metadata partition.

The position where the metadata partition is recorded is acquired based on the file entry of the metadata file. Reading the data in the metadata partition into the memory at once allows the information required for reading out the file to be acquired from the information concerning the metadata partition, read into the memory, and to be analyzed, when the file stored under multiple directories is to be accessed to. In this case, reading out three kinds of information, that is, the file identifier descriptor, the file entry, and the directory information, under the respective directories from the recording medium is avoided.

Figure 10:
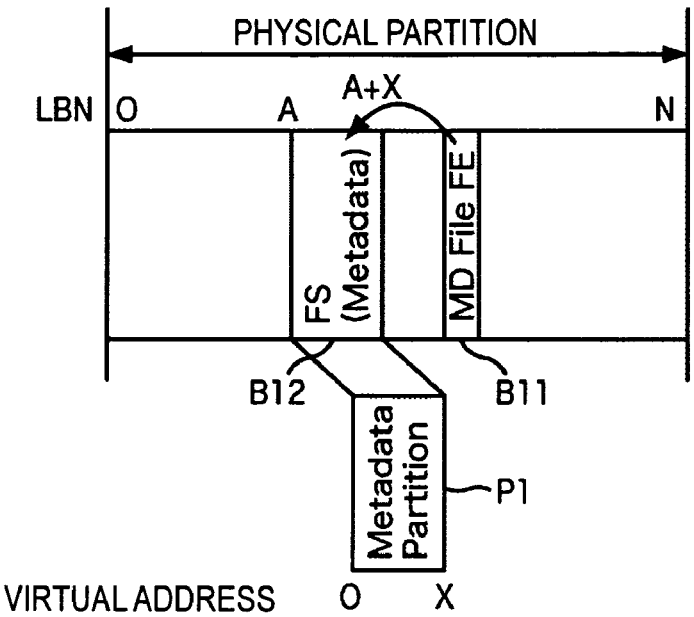
FIG. 10 illustrates a method of allocating the filesystem information to virtual addresses.
Figure 11:
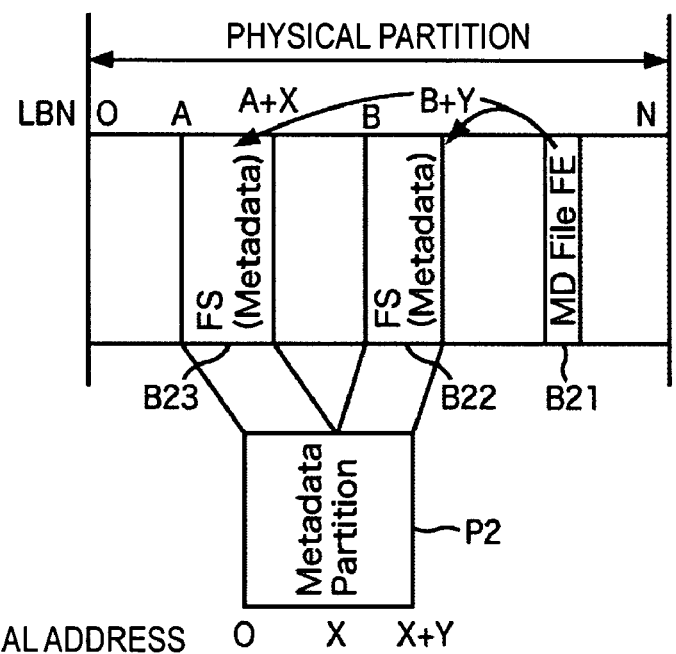
FIG. 11 illustrates another method of allocating the filesystem information to the virtual addresses.
Figure 12:
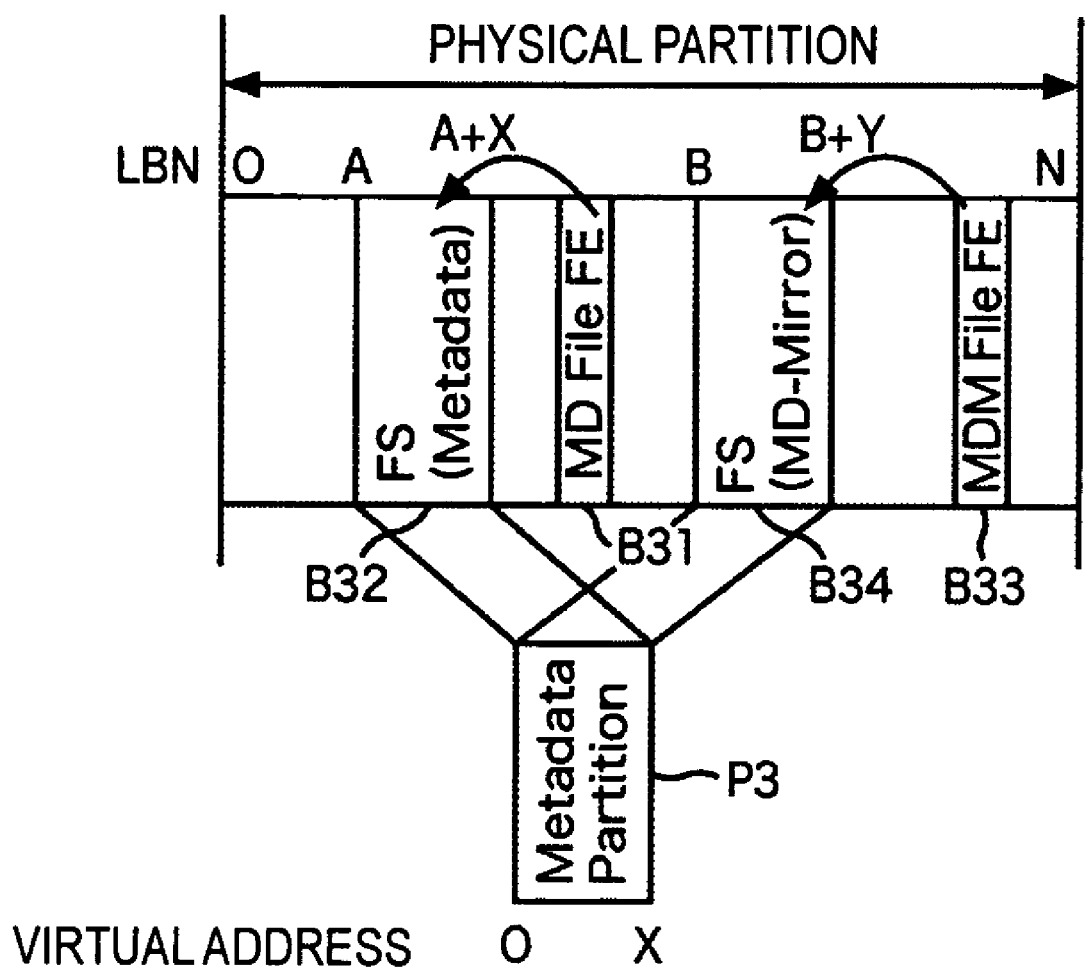
FIG. 12 illustrates another method of allocating the filesystem information to the virtual addresses.

FIGS. 10 to 12 show methods of allocating the filesystem information to virtual address.

The filesystem information is collectively allocated as the metadata file to addresses on the normal physical partition used in a file system. Virtual addresses (address 0 is allocated to the head of the partition) are set in the metadata file, and the filesystem information is arranged in the metadata partition so as to refer to the virtual addresses.

Specifically, it is possible to read out the "File Set Descriptor" numbered 11; the file entry (FE) of the "root" directory, numbered 12; the file identifier Descriptor (FID) of the BDMV directory, numbered 13; the file entry (FE) of the BDMV directory, numbered 14; the file identifier descriptor (FID) of the Unit_Key_Gen_Value.inf file in the BDMV directory, numbered 15; and the file entry (FE) of the Unit_Key_Gen_Value.inf file, numbered 16, which are shown in FIG. 9, based on the virtual addresses in the metadata file.

As shown in the upper part in FIG. 10, a metadata file file-entry (MD File FE) is described in an area B11, and the filesystem information recorded in an area B12 is read out based on the description in the area B11. Specifically, the MD File FE in the area B11 indicates that the filesystem information (FE) is recorded in the area B12, which is an area having addresses A to A+X in the physical partition. As shown in the lower part in FIG. 10, the above filesystem information (FE) is described in an area P1 having virtual addresses 0 to X in the metadata partition.

The metadata partition may be associated with a plurality of areas in the physical partition. For example, as shown in the upper part in FIG. 11, when the filesystem information is arranged in an area 23 having addresses A to A+X in the physical partition and an area 22 having addresses B to B+Y in the physical partition, the MD File FE in an area B21 indicates that the filesystem information is recorded in the area 23 having addresses A to A+X in the physical partition and the area 22 having addresses B to B+Y in the physical partition. As shown in the lower part in FIG. 11, the filesystem information is recorded in an area P2 having virtual addresses 0 to X+Y in the metadata partition.

Furthermore, as a function adopted in the UDF 2.50, the metadata files may be doubly arranged to improve the reliability of the filesystem information. In this case, the same two metadata files (FSs), one being referred to as a main metadata file (main FS) and the other being referred to as a mirror metadata file (mirror FS), are arranged.

As shown in the upper part in FIG. 12, when the main metadata file, which is the filesystem information, is arranged in an area B32 having addresses A to A+X in the physical partition and the mirror metadata file, which is the filesystem information, is arranged in an area B34 having addresses B to B+Y in the physical partition, the MD File FE in an area B31 indicates that the main metadata file is recorded in the area 32 having addresses. A to A+X in the physical partition. As shown in the lower part in FIG. 12, the filesystem information is recorded in an area P3 having virtual addresses 0 to X in the metadata partition as the metadata file. Similarly, the MD File FE in an area B33 indicates that the mirror metadata file is recorded in the area B34 having addresses B to B+Y in the physical partition. As in the main metadata file, as shown in the lower part in FIG. 12, the filesystem information is recorded in the area P3 having virtual addresses 0 to X in the metadata partition as the metadata file. In this manner, the double description of the same metadata file improves the reliability of the filesystem information.

Figure 3:
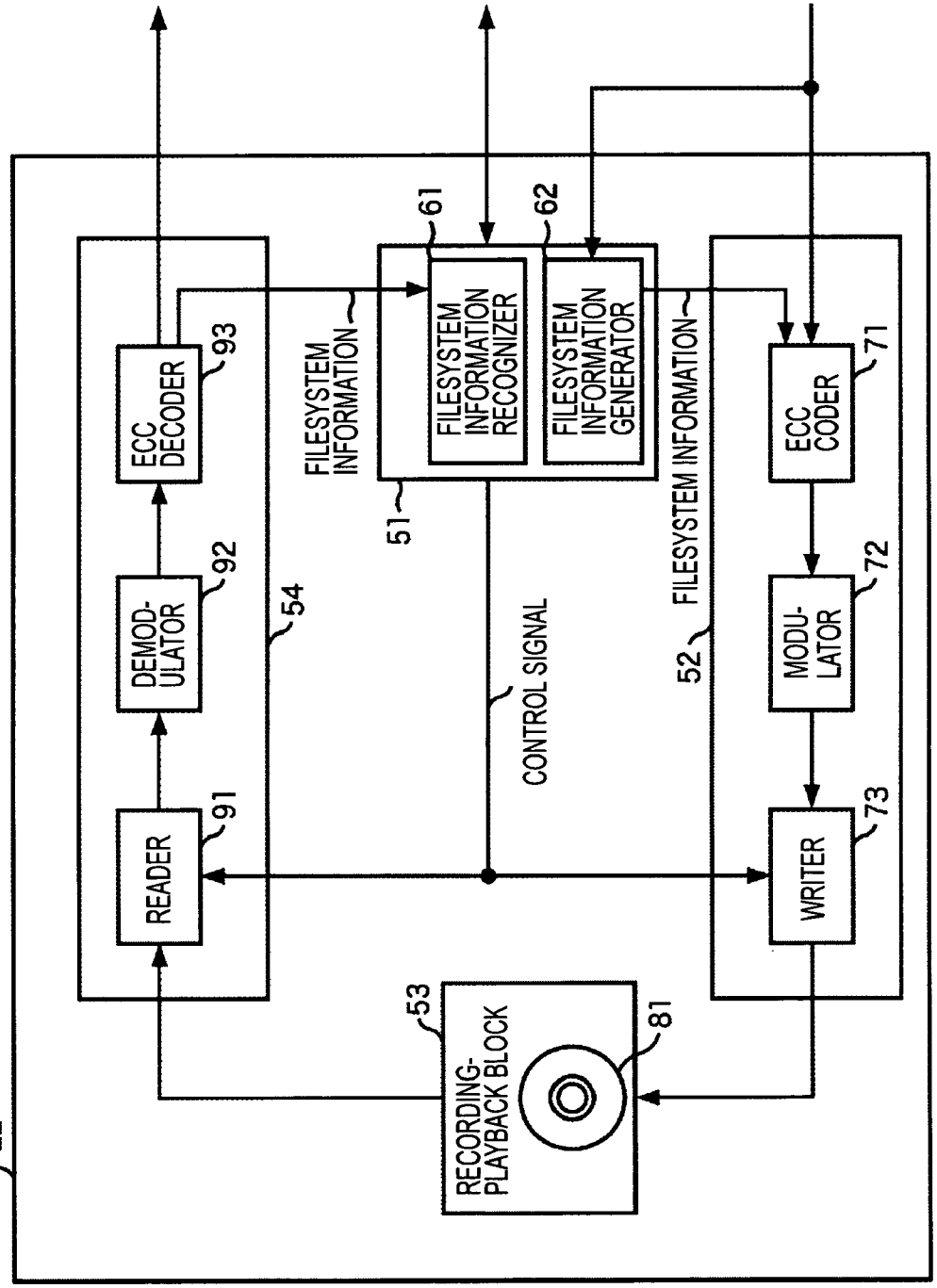
FIG. 3 shows the structure of a recording-playback unit in the recording-playback apparatus in FIG. 2.

FIG. 13 is a flowchart showing a process of recording an AV stream and the files that are managed in the database by the application software program used for recording and/or playing back the AV stream on the recording medium 81 in the recording-playback unit 22 in FIG. 3.

In Step S1, the control section 51 determines whether recording of an additional AV stream is requested. The control section 51 repeats this step until the recording of an additional AV stream is requested. If the recording of an additional AV stream (or recording of a new AV stream) is requested, the process proceeds to Step S2.

In Step S2, the filesystem information recognizer 61 controls the playback section 54 so as to read the filesystem information recorded on the recording medium 81 by the recording-playback block 53 and acquires the filesystem information. Specifically, when the information is recorded in advance on the recording medium 81, as shown in the upper part in FIG. 14, the filesystem information recognizer 61 reads out the filesystem information recorded in areas B12 and B13.

Figure 1:
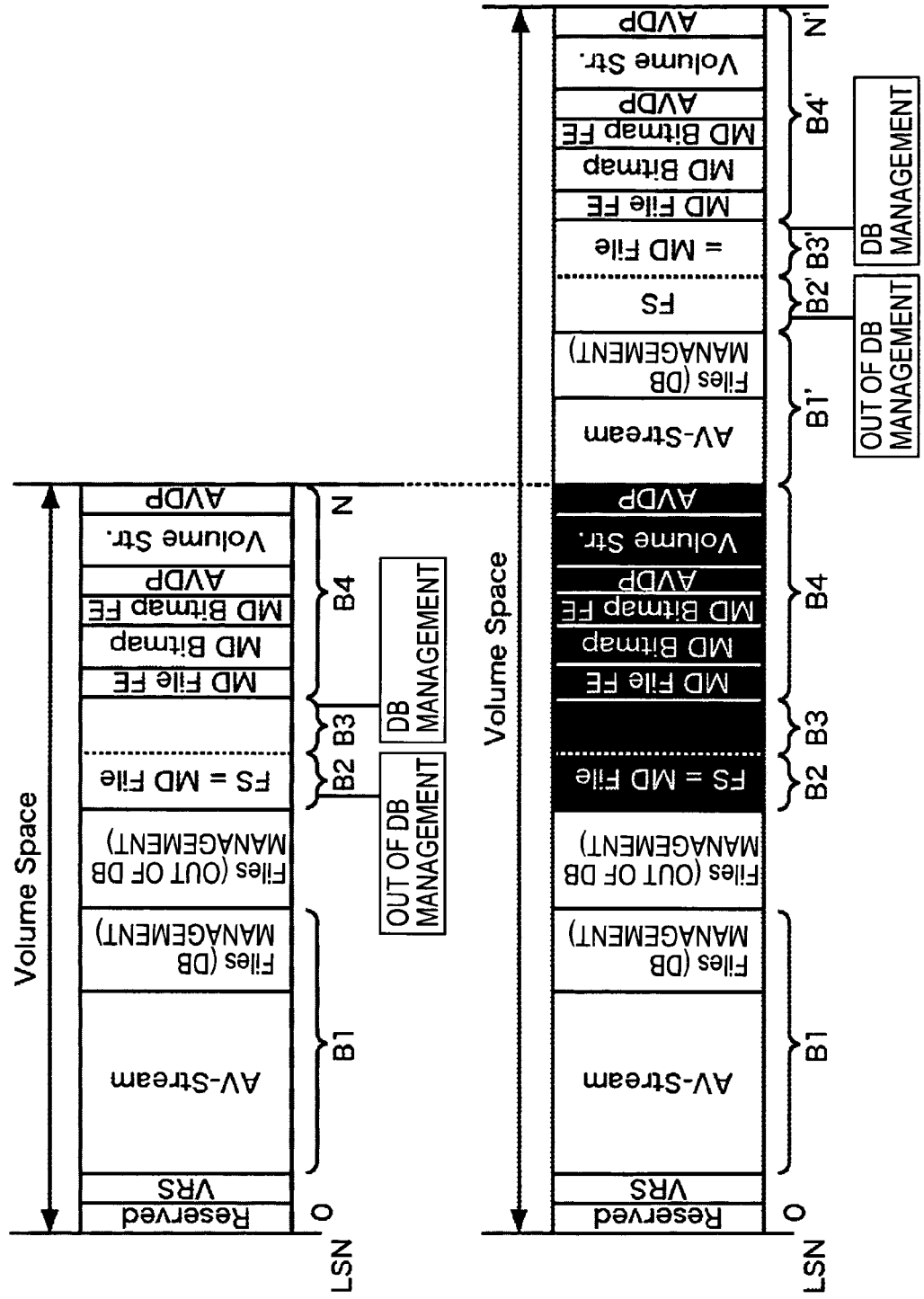
FIG. 1 illustrates a recording process of filesystem information in related art.
Figure 14:
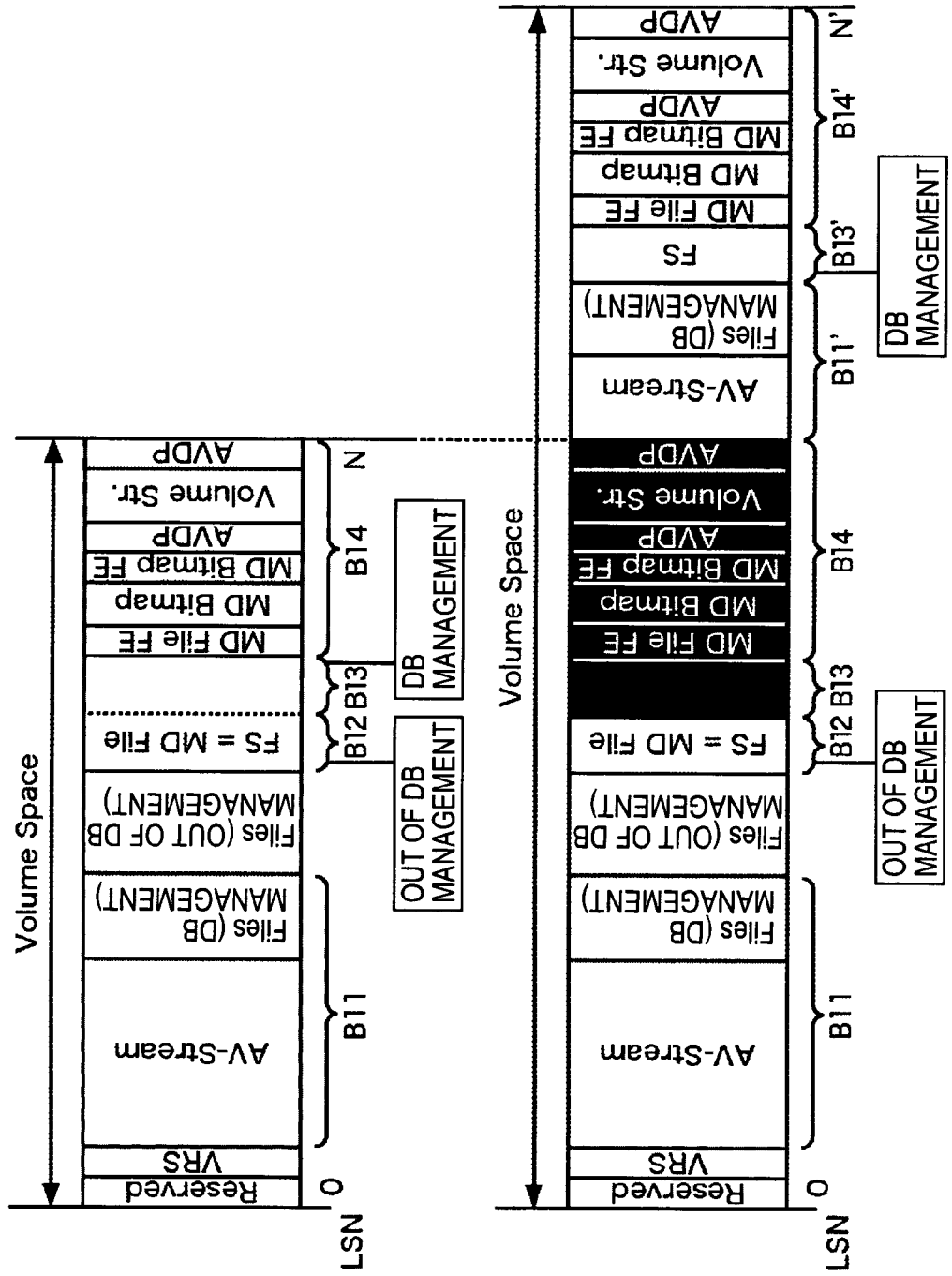
FIG. 14 illustrates the recording process by the recording-playback unit in FIG. 3.

Areas B11 to B14 in the upper part in FIG. 14 are similar to the areas B1 to B4 in the upper part in FIG. 1.

When the recording process is performed for the first time, Step S2 is substantially skipped because the recording areas are only provided in formatting and the filesystem information does not exit.

In Step S3, the filesystem information generator 62 records the supplied AV stream and the files (Files (DB management)) that are managed in the database by the application software program used for playing back the AV stream in the recording area. Specifically, when the information is recorded in advance on the recording medium 81, as shown in the upper part in FIG. 14, the filesystem information generator 62 causes the recording-playback block 53 to write the AV stream supplied to the writer 73 through the ECC encoder 71 and the modulator 72 and the files (DB management) in an area B11' downstream of the area B14, as shown in the lower part in FIG. 14.

In Step S4, the filesystem information generator 62 extracts the additional parts of the AV stream and of the files managed in the database in the previous filesystem information. The previous filesystem information is recorded in the areas B12 and B13 in the upper part in FIG. 14 and, among the areas B12 and B13, the additional parts of the AV stream and of the files managed in the database are recorded in the area B13 (the area described as (DB management). Accordingly, the filesystem information generator 62 extracts the information described in the area B13 in the readout filesystem information.

In Step S5, the filesystem information generator 62 makes the additional parts of the AV stream and of the files managed in the database in the previous filesystem information (the filesystem information before the additional AV stream and the additional files are recorded) unreadable. Specifically, since the additional parts of the AV stream and of the files managed in the database in the previous filesystem information are recorded in the area B13, as shown in the upper part in FIG. 14, the filesystem information generator 62 makes the information in the area B13 unreadable, as shown in the lower part in FIG. 14 (as indicated in black).

When the recording process is performed for the first time, Steps S4 and S5 are substantially skipped because the recording areas are only provided in formatting and the filesystem information does not exit.

In Step S6, the filesystem information generator 62 generates the filesystem information corresponding to the additional parts of the AV stream and of the files managed in the database, and records the generated filesystem information on the recording medium 81. Specifically, the filesystem information generator 62 generates the filesystem information concerning the part corresponding to the additional AV stream and the additional files (DB management) and causes the recording-playback block 53 through the ECC encoder 71 and the modulator 72 to write the generated filesystem information in an area B13' downstream of the area B11', as shown in the lower part in FIG. 14.

In Step S7, the filesystem information generator 62 makes the area having the previous "MD File FE", "MD Bitmap", "MD Bitmap FE", "AVDP", and "Volume Str." described unreadable. Specifically, since the previous "MD File FE", "MD Bitmap", "MD Bitmap FE", "AVDP", and "Volume Str." are recorded in the area B14, as shown in the upper part in FIG. 14, the filesystem information generator 62 makes the information in the area B14 unreadable, as shown in the lower part in FIG. 14 (as indicated in black).

In Step S8, the filesystem information generator 62 records the "MD File FE", "MD Bitmap", "MD Bitmap FE", "AVDP", and "Volume Str." corresponding to the additional AV stream and the additional files managed in the database. The process then goes back to Step S1 to repeat the above steps. Specifically, the filesystem information generator 62 causes the recording-playback block 53 through the ECC encoder 71 and the modulator 72 to write the "MD File FE", "MD Bitmap", "MD Bitmap FE", "AVDP", and "Volume Str." corresponding to the additional AV stream and the additional Files (DB management) in an area B14' downstream of the area B13', as shown in the lower part in FIG. 14.

Through the above process, the filesystem information concerning the files that are not managed in the database by the application software program used for recording and/or playing back the AV stream is left in the previous areas when an additional AV stream and additional files that are managed in the database by the application software program are recorded, so that it is possible to save the recording space.

In the related art, when an additional AV stream and additional files that are managed in the database by the application software program for the AV stream are recorded, the areas B2, B3, and B4 are made unreadable and the additional information is recorded in the areas B1', B2', B3', and B4', as shown in the lower part in FIG. 1. In contrast, in the above process, it is sufficient to make only the areas B13 and B14 are unreadable and to additionally record the information only in the areas B11' B13' and B14', as shown in the lower part in FIG. 14. Hence, the space used for the recording on the recording medium 81 is saved in the above process because the area B12 is not made unreadable and the need for additionally record the information in the corresponding area is eliminated.

The example in which only the filesystem information involving the additional recording of the AV stream is recorded to save the space on the recording medium 81 when an additional AV stream is recorded is described above. However, saving the space on the recording medium 81 consumed when an additional AV stream and additional files that are managed in the database by the application software program for the AV stream are recorded causes the areas where the files that are managed in the database by the application software program used for recording and/or playing back the AV stream are recorded to be separated from each other. The files that have the same attribute but are separately recorded on the recording medium 81 are not able to continuously read out, thus causing a decrease in the readout speed.

Accordingly, when an additional AV stream and additional files that are managed in the database by the application software program for the AV stream are recorded, the files that are managed in the database by the application software program used for recording and/or playing back the AV stream may be collectively recorded.

Figure 15:
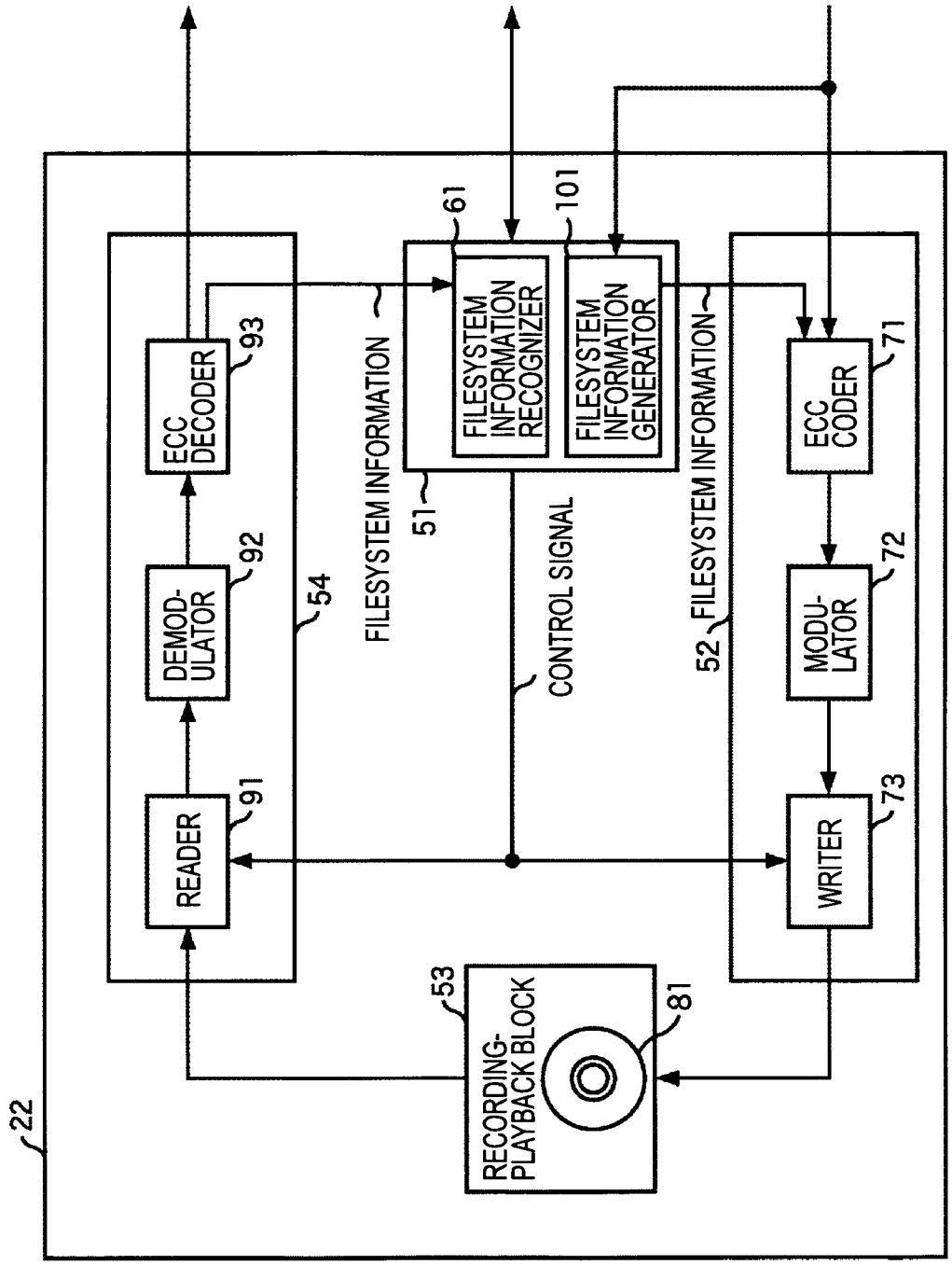
FIG. 15 shows the structure of a recording-playback unit according to another embodiment of the present invention.

FIG. 15 shows the structure of the recording-playback unit 22, according to another embodiment of the present invention, in which the files that are managed in the database by the application software program used for recording and/or playing back the AV stream are collectively recorded when an additional AV stream and additional files that are managed in the database by the application software program for the AV stream are recorded. The same reference numerals are used in the recording-playback unit 22 in FIG. 15 to identify the same components shown in the recording-playback unit 22 in FIG. 3. A description of such components is appropriately omitted herein.

The recording-playback unit 22 in FIG. 15 differs from the recording-playback unit 22 in FIG. 3 in that a filesystem information generator 101 is provided, instead of the filesystem information generator 62.

The filesystem information generator 101 has a basic function similar to that of the filesystem information generator 62. However, when additional files are to be recorded, the filesystem information generator 101 updates the filesystem information corresponding to the application software program using the additional files to record the updated filesystem information and, furthermore, integrates the previous files (DB management) with the additional files (DB management) to collectively record the integrated files. In this case, the area where the previous files (DB management) have been recorded is made unreadable, along with the filesystem information that has been recorded.

Figure 16:
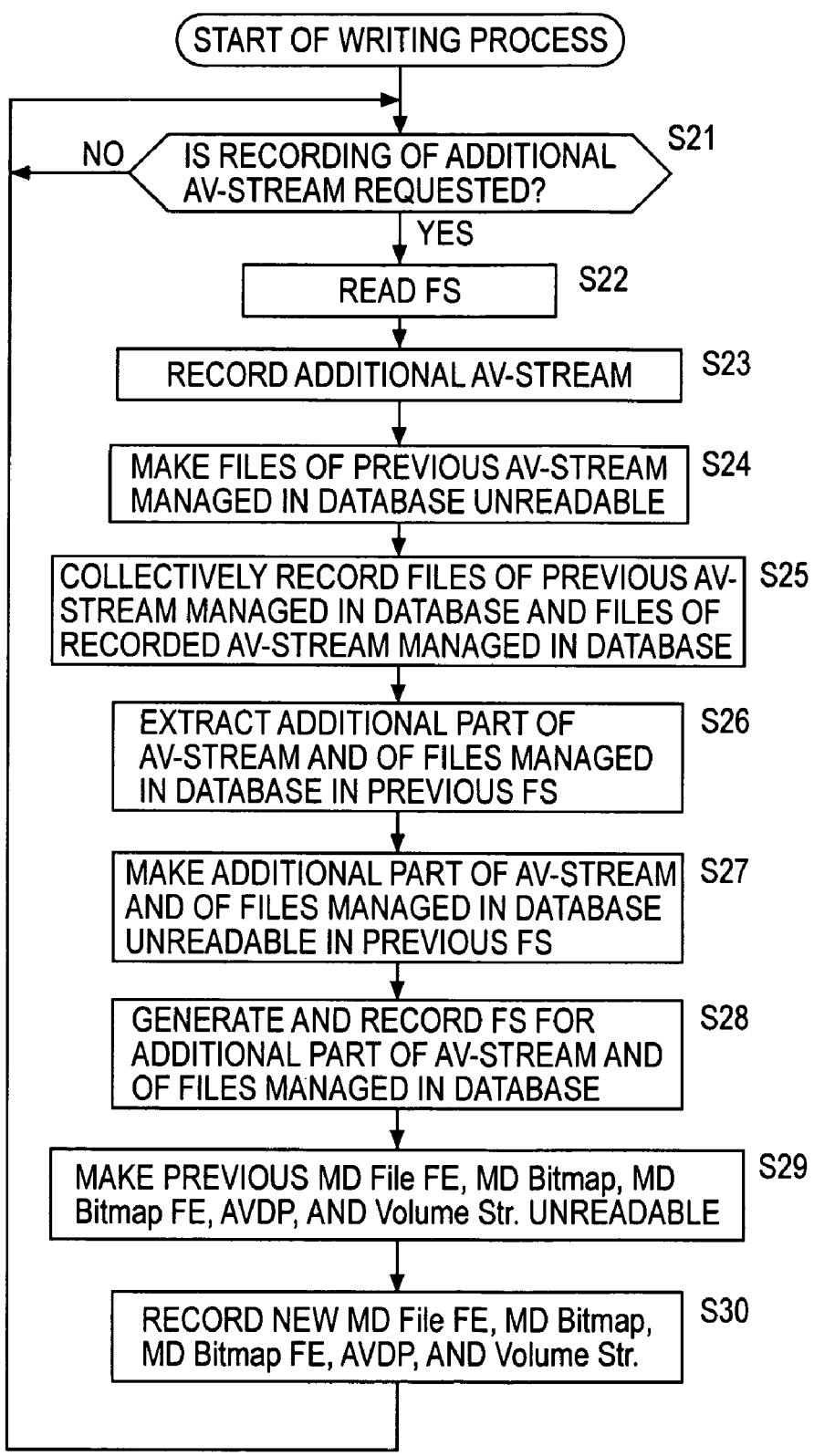
FIG. 16 is a flowchart showing a recording process by the recording-playback unit in FIG. 15.

FIG. 16 is a flowchart showing a process of recording an AV stream and the files that are managed in the database by the application software program used for recording and/or playing back the AV stream on the recording medium 81 in the recording-playback unit 22 in FIG. 15.

Since the steps S21, S22, and S26 to S30 in the flowchart in FIG. 16 are similar to the steps S1, S2, and S4 to S8 described with reference to the flowchart in FIG. 13, a description of such steps is omitted herein.

In Step S23, the filesystem information generator 101 records the supplied AV stream in the recording area. Specifically, when the information is recorded in advance on the recording medium 81, as shown in the upper part in FIG. 17, the filesystem information generator 101 causes the recording-playback block 53 to write the AV stream supplied to the writer 73 through the ECC encoder 71 and the modulator 72 in an area B21' downstream of an area B25, as shown in the lower part in FIG. 17.

Figure 17:
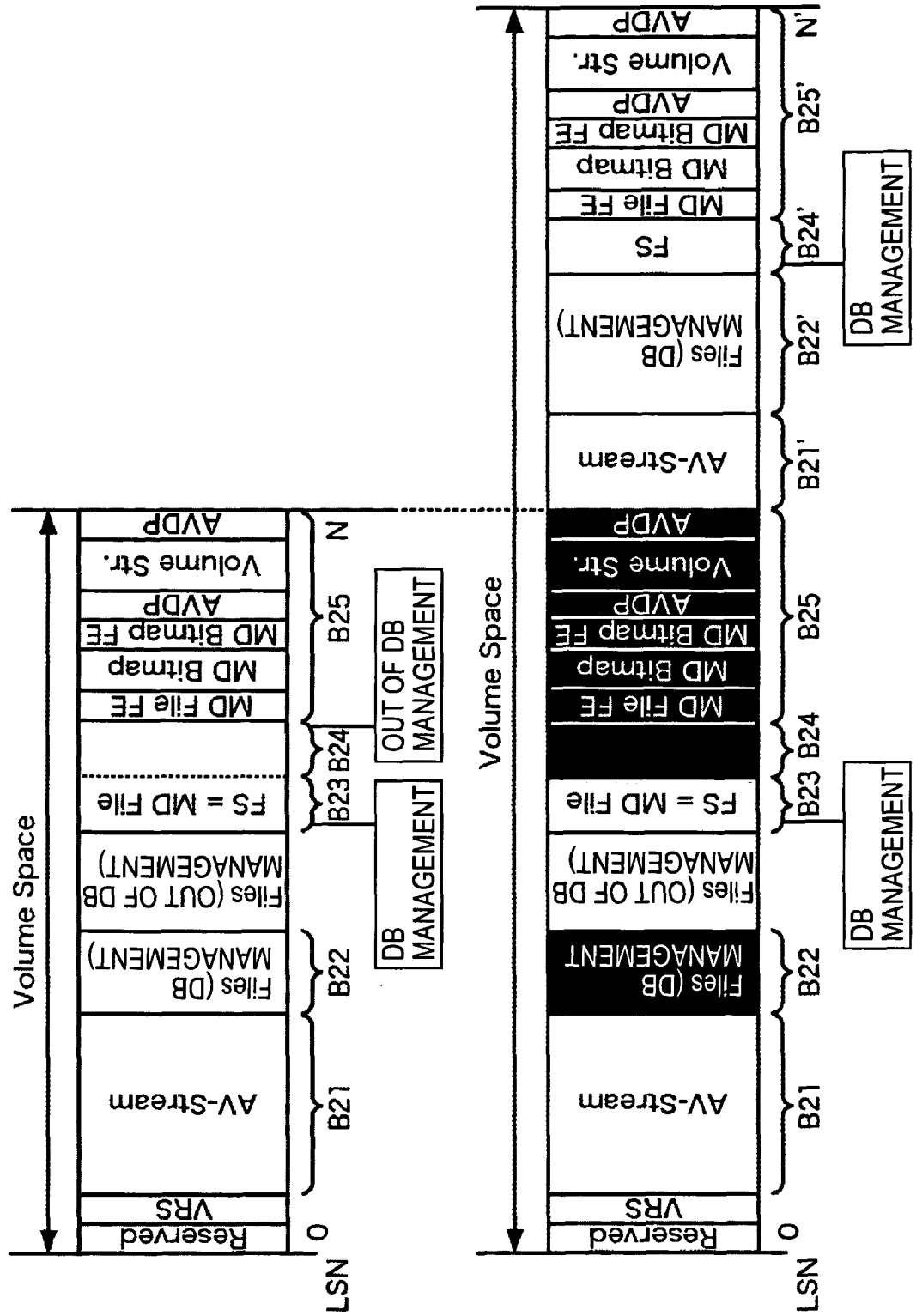
FIG. 17 illustrates the recording process by the recording-playback unit in FIG. 15.

The areas B21 and B22 in FIG. 17 correspond to the area B11 in FIG. 14. Referring to FIG. 17, the area 21 where the AV stream is recorded is separated from the area 22 where the files that are managed in the database by the application software program used for recording and/or playing back the AV stream are recorded. Areas B23, B24, and B25 in FIG. 17 are similar to the areas B12, B13, and B14 in FIG. 14.

In Step S24, the filesystem information generator 101 makes the area where the files that are managed in the database by the application software program used for recording and/or playing back the previous AV stream have been recorded unreadable. Specifically, since the additional part of the files that are managed in the database by the application software program used for recording and/or playing back the previous AV stream is recorded in the area B22, as shown in the upper part in FIG. 17, the filesystem information generator 101 makes the information in the area B22 unreadable, as shown in the lower part in FIG. 17 (as indicated in black).

In Step S25, the filesystem information generator 101 collectively records, in the recording area, the files that are managed in the database by the application software program used for recording and/or playing back the supplied (additional) AV stream and the files that are managed in the database by the application software program used for recording and/or playing back the previous AV stream. Specifically, when the information is recorded in advance on the recording medium 81, as shown in the upper part in FIG. 17, the filesystem information generator 101 causes the recording-playback block 53 to write the AV stream supplied to the writer 73 through the ECC encoder 71 and the modulator 72 in an area B22' downstream of the area B21', as shown in the lower part in FIG. 17.

The areas B24' and B25' in FIG. 17 are similar to the areas B13' and B14' in FIG. 14.

Although, in the above process, more space on the recording medium 81 is consumed in the recording process by the recording-playback unit 22 in FIG. 15, compared with the recording process by the recording-playback unit 22 in FIG. 3, because the areas where the files managed in the database have been recorded before an additional AV stream is recorded are made unreadable each time an additional AV stream is recorded, collectively arranging the files managed in the database allows the readout speed to increase, compared with the case in which the files managed in the database are separately arranged. As a result, compared with the related art, it is possible to increase the readout speed of the recorded files managed in the database while saving the space, on the recording medium 81, consumed each time an additional AV stream is recorded.

Although the case in which the filesystem information and the files managed in the database are respectively recorded in one area on the recording medium is described above, a copy file (mirror file) may be respectively provided for the filesystem information and for the files managed in the database to improve the reliability of the recorded information.

Figure 18:
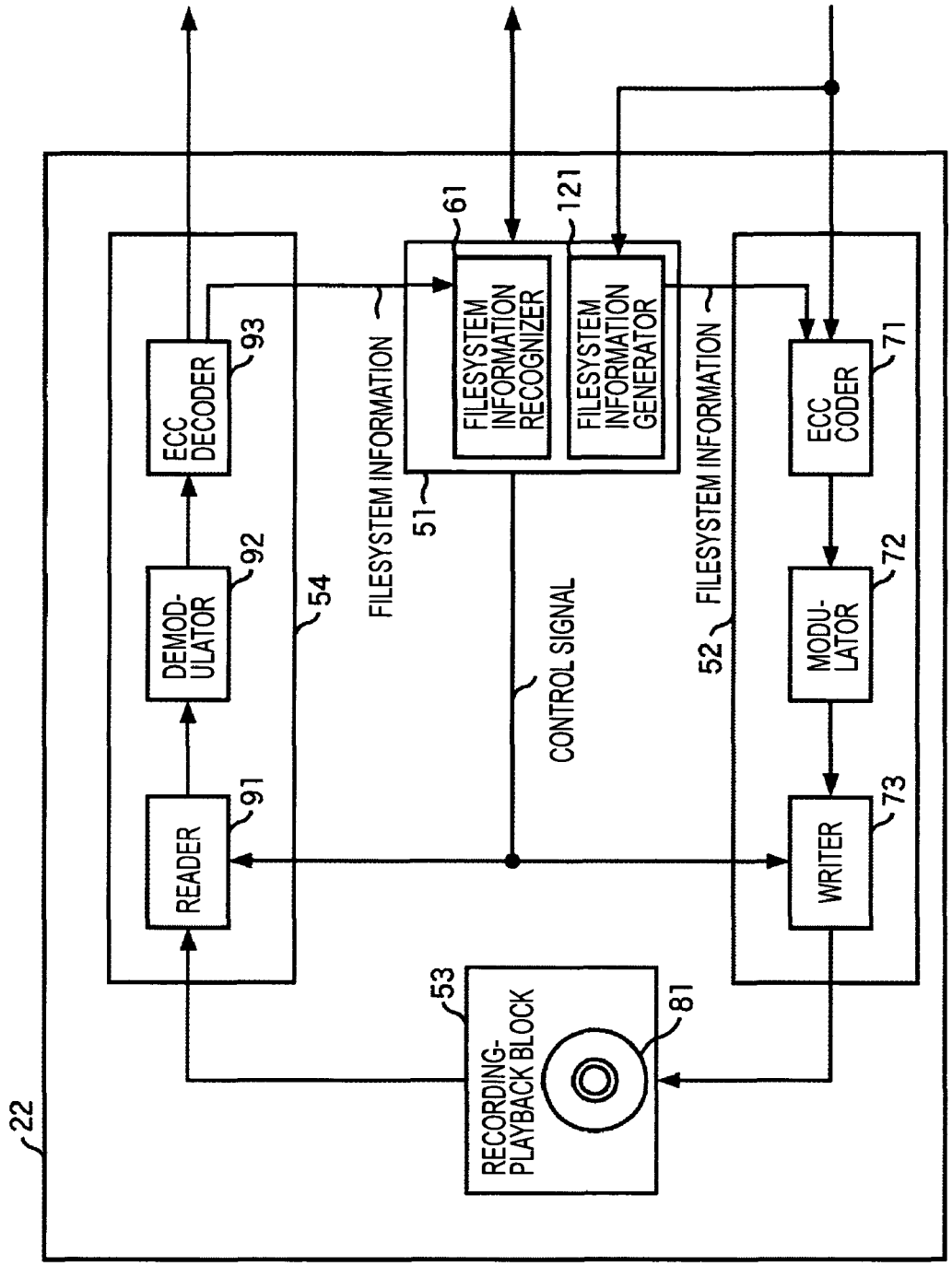
FIG. 18 shows the structure of a recording-playback unit according to another embodiment of the present invention.

FIG. 18 shows the structure of the recording-playback unit 22, according to another embodiment of the present invention, in which the files that are managed in the database by the application software program used for recording and/or playing back the AV stream are collectively recorded and, in addition, the files managed in the database by the application software program and the filesystem information are respectively subjected to double recording when an additional AV stream and additional files that are managed in the database by the application software program for the AV stream are to be recorded. The same reference numerals are used in the recording-playback unit 22 in FIG. 18 to identify the same components shown in the recording-playback unit 22 in FIG. 15. A description of such components is appropriately omitted herein.

The recording-playback unit 22 in FIG. 18 differs from the recording-playback unit 22 in FIG. 15 in that a filesystem information generator 121 is provided, instead of the filesystem information generator 101.

The filesystem information generator 121 has a basic function similar to that of the filesystem information generator 101. However, the filesystem information generator 121 differs from the filesystem information generator 101 in that the files that are managed in the database by the application software program and the filesystem information are respectively subjected to the double recording.

Figure 19:
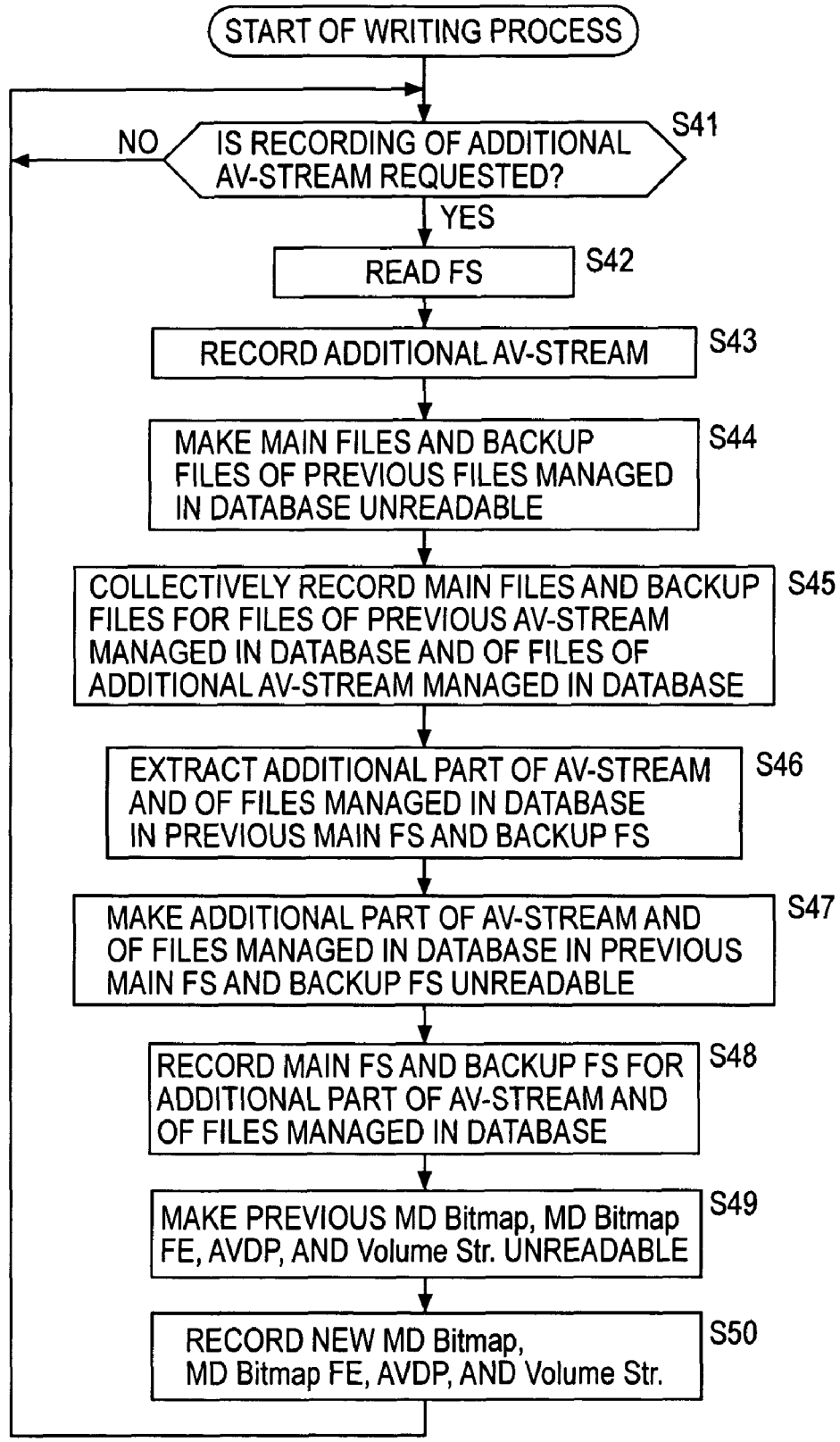
FIG. 19 is a flowchart showing a recording process by the recording-playback unit in FIG. 18.

FIG. 19 is a flowchart showing a process of recording an AV stream and the files that are managed in the database by the application software program used for recording and/or playing back the AV stream on the recording medium 81 in the recording-playback unit 22 in FIG. 18.

Since the steps from S41 to S43 in the flowchart in FIG. 19 are similar to the steps from S21 to S23 described above with reference to the flowchart in FIG. 16 (including the steps in S1 and S2 described above with reference to the flowchart in FIG. 13), a description of such steps is omitted herein. In the following description, the filesystem information (FS) resulting from the double recording is referred to as main FS and backup FS, and the files managed in the database, resulting from the double recording, are referred to as main files managed in the database and backup files managed in the database.

In Step S44, the filesystem information generator 121 makes the area where the main files and backup files that are managed in the database by the application software program used for recording and/or playing back the previous AV stream have been recorded unreadable. Specifically, since the main files and backup files that are managed in the database by the application software program used for recording and/or playing back the previous AV stream have been recorded in an area B32, as shown in the upper part in FIG. 20, the filesystem information generator 121 makes the information in the area B32 unreadable, as shown in the lower part in FIG. 20 (as indicated in black).

An area B31 in FIG. 20 corresponds to the area B21 in FIG. 17. The area B32 in FIG. 20, where the main files and backup files managed in the database are recorded, corresponds to the area B22 in FIG. 17. Areas B33 and B36 in FIG. 20, where the main FS (FS (main)=MD File) and the backup FS (FS (Backup)=MDM File (Metadata Mirror File)) concerning the main files and backup files that are not managed in the database are respectively recorded, correspond to the area B23 in FIG. 17.

Areas B34 and B37 in FIG. 20, where the main FS (FS (main)=MD File) and the backup FS (FS (Backup)=MDM File (Metadata Mirror File)) concerning the main files and backup files managed in the database are respectively recorded, correspond to the area B24 in FIG. 17. Areas B35 and B38 have file entries (MD File FE and MDM (Metadata Mirror) File FE) of the main FS and the backup FS recorded. An area B39 has "MD Bitmap", "MD Bitmap FE", "AVDP", and "Volume Str." recorded. Accordingly, it is presumed that an area including the areas B35, B38, and B39 in FIG. 20 corresponds to the area B25 in FIG. 17.

In Step S45, the filesystem information generator 121 collectively records, in the recording area, the main files and backup files that are managed in the database by the application software program used for recording and/or playing back the supplied (additional) AV stream and the main files and backup files that are managed in the database by the application software program used for recording and/or playing back the previous AV stream.

Specifically, when the information is recorded in advance on the recording medium 81, as shown in the upper part in FIG. 20, the filesystem information generator 121 causes the recording-playback block 53 to write the main files of the AV stream supplied to the writer 73 through the ECC encoder 71 and the modulator 72 in an area B32' downstream of an area B31' where the supplied AV stream is recorded and, then, to write a copy of the main files as the backup files, as shown in the lower part in FIG. 20.

In Step S46, the filesystem information generator 121 extracts the additional parts of the AV stream and of the files managed in the database in the previous main FS and backup FS. Specifically, the previous main FS and backup FS are respectively recorded in the areas B33 and B34 and the areas B36 and B37 in FIG. 20 and, among theses areas, the additional parts of the AV stream and the files managed in the database are recorded in the area B34 and B37 (the area indicated as (DB management) in FIG. 20). Accordingly, the filesystem information generator 121 extracts the information described the areas B34 and B37 in the readout main FS and backup FS.

In Step S47, the filesystem information generator 121 makes the additional parts of the AV stream and of the files managed in the database in the previous main FS and backup FS unreadable. Specifically, since the additional parts of the AV stream and the files managed in the database in the previous main FS and backup FS are recorded in the areas B34 and B37, respectively, as shown in the upper part in FIG. 20, the filesystem information generator 121 makes the information in the areas B34 and B37 unreadable, as shown in lower part in FIG. 20 (as indicated in black). The filesystem information generator 121 also makes the areas B35 and B38 where the MD File FE and the MDM File FE are recorded unreadable.

When the recording process is performed for the first time, Steps S46 and S47 are substantially skipped because the recording areas are only provided in formatting and the filesystem information does not exit.

In Step S48, the filesystem information generator 121 generates the main FS for the additional parts of the AV stream and of the files managed in the database to record the generated main FS on the recording medium 81 and, then, to record a copy of the main FS as the backup FS. Specifically, the filesystem information generator 121 generates the main FS for the part corresponding to the additional AV stream and the additional files (DB management) and causes the recording-playback block 53 through the ECC encoder 71 and the modulator 72 to write the generated main FS in an area B33' downstream of an area B32', as shown in the lower part in FIG. 20. The filesystem information generator 121 also records the MD File FE indicating the recording position in an area B35'. Furthermore, the filesystem information generator 121 records a copy of the main FS in an area B37' as the backup FS and records the MDM File FE indicating the recording position in an area B38'.

In Step S49, the filesystem information generator 121 makes the area where the previous "MD Bitmap", "MD Bitmap FE", "AVDP", and "Volume Str." have been recorded unreadable. Specifically, since the previous "MD Bitmap", "MD Bitmap FE", "AVDP", and "Volume Str." have been recorded in the area B39, as shown in the upper part in FIG. 20, the filesystem information generator 121 makes the information in the area B39 unreadable, as shown in the lower part in FIG. 20 (as indicated in black).

In Step S50, the filesystem information generator 121 records the "MD Bitmap", "MD Bitmap FE", "AVDP", and "Volume Str." corresponding to the additional AV stream and the additional main files and backup files managed in the database. The process then goes back to Step S41 to repeat the above steps. Specifically, the filesystem information generator 121 causes the recording-playback block 53 through the ECC encoder 71 and the modulator 72 to write the "MD Bitmap", "MD Bitmap FE", "AVDP", and "Volume Str." corresponding to the additional AV stream and the additional Files (DB management) in an area B39' downstream of the area B38', as shown in the lower part in FIG. 20.

Since the double recording of the files managed in the database and the filesystem information increases the number of the areas made unreadable each time an additional AV stream is recorded, more space is consumed on the recording medium 81 in the recording-playback unit 22 in FIG. 18 in the above process, compared with the recording processes in the recording-playback unit 22 in FIG. 3 and the recording-playback unit 22 in FIG. 15. However, since the files managed in the database are collectively arranged, it is possible to increase the readout speed, compared with the case in which the files managed in the database are separately arranged. In addition, the double recording of the files managed in the database and the filesystem information improves the stability in the readout of the AV stream and the files even if the files or the filesystem information is damaged. As a result, compared with the related art, it is possible to increase the readout speed of the recorded files managed in the database and to improve the stability in the readout process while saving the space on the recording medium 81 consumed each time an additional AV stream is recorded.

The series of processing described above may be performed by hardware or may be performed by software. When the series of processing is performed by software, the programs in the software are installed from the recording medium to a computer incorporated in dedicated hardware or to a computer, such as a general-purpose computer, which is capable of executing various functions by installing various programs.

As shown in FIG. 2, the recording medium storing the programs may be a package medium, such as the magnetic disk 41 (including a flexible disk), the optical disk 42 (including a compact disc-read only memory (CD-ROM) and a digital versatile disk (DVD)), the magneto-optical disk 43 (including a minidisc (MD)), or the semiconductor memory 44, which is distributed in order to provide the programs to a user and on which the programs are recorded, or may be the ROM 12 or the hard disk in the storage unit 18, which is offered to the user with being incorporated in the computer and which stores the programs.

In the specification, the steps describing the programs to be recorded on the recording medium may be performed in time series in the described order, or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording apparatus, comprising:
   recording means for recording a file and file system information on a recording medium;
   file system information generating means for generating the file system information for an application software program that uses the file; and
   operation control means for controlling the recording means to allocate the file system information to virtual addresses as one file, wherein,
   when the file is to be recorded by the recording means, the operation control means controls the recording means to extract, from the recording medium, previous file system information including previous file system information concerning files not managed by the application software program and previous file system information concerning files managed by the application software program, to make the previous file system information concerning the files managed by the application software program unreadable, to update the previous file system information concerning the files managed by the application software program based on the file, and to record the updated previous file system information concerning the files managed by the application software program on the recording medium, adjacent, in the virtual addresses, to a file used for playing back the file to be recorded.

2. The information recording apparatus according to claim 1, wherein the recording medium is a write-once medium.

3. The information recording apparatus according to claim 1, wherein the recording medium is a write-once optical disk on which data is recorded and/or played back by using a blue-violet laser light.

4. The information recording apparatus according to claim 1, wherein the file is managed based on the Universal Disk Format.

5. The information recording apparatus according to claim 1, wherein the operation control means controls the recording medium to doubly allocate the previous file system information concerning the files managed by the application software program to the virtual addresses, and controls the recording medium to doubly record the updated previous file system information concerning the files managed by the application software program on the recording medium when the file is to be recorded by the recording means.

6. The information recording apparatus according to claim 5, wherein, when the file is to be recorded by the recording means, the operation control means controls the recording means to doubly record the updated previous file system information concerning the files managed by the application software program on the recording medium, and controls the recording medium to collectively and doubly record both an existing file managed by the application software program and the file to be recorded.

7. The information recording apparatus according to claim 1, wherein, when the file is to be recorded by the recording means, the operation control means controls the recording means to collectively record an existing file and the file to be recorded on the recording medium.

8. An information recording method, comprising:
   recording a file and file system information on a recording medium;
   generating the file system information for an application software program that uses the file; and
   controlling the recording to allocate the file system information to virtual addresses as one file, wherein,
   when the file is to be recorded in the recording, the recording is controlled in the controlling to extract, from the recording medium, previous file system information including previous file system information concerning files not managed by the application software program and previous file system information concerning files managed by the application software program, to make the previous file system information concerning the files managed by the application software program unreadable, to update the previous file system information concerning the files managed by the application software program based on the file, and to record the updated previous file system information concerning the files managed by the application software program on the recording medium, adjacent, in the virtual addresses, to a file used for playing back the file to be recorded.

9. The recording medium on which the file and the file system information recording method according to claim 8.

10. A non-transitory, program storage medium storing a computer-readable program, wherein the program, when executed by a processor, causes the processor to perform a method comprising:
    controlling a recording of a file and file system information on a recording medium;
    controlling a generation of the file system information for an application software program that uses the file; and
    controlling the controlling the recording to allocate the file system information to virtual addresses as one file, wherein,
    when the file is to be recorded in the controlling the recording, the controlling the recording is controlled in the controlling the controlling to extract, from the recording medium, previous file system information including previous file system information concerning files not managed by the application software program and previous file system information concerning files managed by the application software program, to make the previous file system information concerning the files managed by the application software program unreadable, to update the previous file system information concerning the files managed by the application software program based on the file, and to record the updated previous file system information concerning the files managed by the application software program on the recording medium, adjacent, in the virtual addresses, to a file used for playing back the file to be recorded.

11. An information recording apparatus, comprising:
    a recorder configured to record a file and file system information on a recording medium;
    a file system information generator configured to generate the file system information for an application software program that uses the file; and
    an operation controller configured to control the recorder to allocate the file system information to virtual addresses as one file, wherein,
    when the file is to be recorded by the recorder, the operation controller controls the recorder to extract, from the recording medium, previous file system information including previous file system information concerning files not managed by the application software program and previous file system information concerning files managed by the application software program, to make the previous file system information concerning the files managed by the application software program unreadable, to update the previous file system information concerning the files managed by the application software program based on the file, and to record the updated previous file system information concerning the files managed by the application software program on the recording medium, adjacent, in the virtual addresses, to a file for playing back the file to be recorded.

* * * * *